(12) United States Patent
Cohn et al.

(10) Patent No.: US 6,409,458 B1
(45) Date of Patent: Jun. 25, 2002

(54) LOW FLOOR VEHICLE RAMP ASSEMBLY

(75) Inventors: Alan R. Cohn, Lockeford; Cleatus A. Lewis, Modesto; Curtis J. Simon, Pine Grove, all of CA (US)

(73) Assignee: Lift-U, Division of Hogan Mfg., Inc., Escalon, CA (US)

( * ) Notice: Subject to any disclaimer, the term of this patent is extended or adjusted under 35 U.S.C. 154(b) by 0 days.

(21) Appl. No.: 09/563,774

(22) Filed: May 2, 2000

Related U.S. Application Data

(63) Continuation of application No. 09/164,434, filed on Sep. 30, 1998, now abandoned, which is a continuation-in-part of application No. 09/060,948, filed on Apr. 15, 1998, now Pat. No. 6,186,733.

(51) Int. Cl.⁷ .................................................. B60P 1/43
(52) U.S. Cl. ......................... 414/537; 14/71.1; 414/921
(58) Field of Search ................................ 414/477, 480, 414/522, 537, 558, 921; 296/26.09, 26.1; 14/71.1

(56) References Cited

U.S. PATENT DOCUMENTS

| | | | |
|---|---|---|---|
| 3,511,393 A | 5/1970 | Abromavage et al. | |
| 4,078,678 A | 3/1978 | Tordella | |
| 4,131,209 A | 12/1978 | Manning | |

(List continued on next page.)

FOREIGN PATENT DOCUMENTS

| | | |
|---|---|---|
| AT | 374 154 | 3/1984 |
| DE | 42 34 064 A1 | 5/1993 |
| EP | 0 217 265 A1 | 4/1987 |
| EP | 0 578 574 A1 | 1/1994 |
| GB | 2 313 589 | 12/1997 |
| WO | WO 99/12506 | 3/1999 |

*Primary Examiner*—James W. Keenan
(74) *Attorney, Agent, or Firm*—Christensen O'Connor Johnson Kindness PLLC

(57) ABSTRACT

A ramp assembly (20) for mounting in a low floor bus (22) or other vehicle. The ramp assembly (20) includes a rectangular enclosure (24) that fits underneath the chassis of the low floor bus (22). The ramp assembly (20) includes a reciprocating mechanism (26) for moving a ramp platform (28) between a fully deployed position and a fully stowed position. During this movement, the reciprocating mechanism (26) raises the trailing end of the ramp platform (28) in one translational movement with the extension of the ramp platform, such that the trailing end of the ramp platform, when deployed, is raised to the floor level of the low floor bus (22).

14 Claims, 33 Drawing Sheets

U.S. PATENT DOCUMENTS

| | | | |
|---|---|---|---|
| 4,294,571 A | * 10/1981 | Tordella | 414/537 |
| 4,325,668 A | 4/1982 | Julian et al. | |
| 4,339,224 A | 7/1982 | Lamb | |
| 4,466,771 A | 8/1984 | Thorley et al. | |
| 4,685,857 A | * 8/1987 | Goeser et al. | 414/522 |
| 4,685,858 A | 8/1987 | Manning et al. | |
| 4,759,682 A | 7/1988 | Hood | |
| 4,824,158 A | 4/1989 | Peters et al. | |
| 4,827,538 A | 5/1989 | Heimann et al. | |
| 4,827,548 A | 5/1989 | Hood | |
| 4,845,792 A | 7/1989 | Bakula et al. | |
| 4,850,788 A | * 7/1989 | Dickson | 414/537 |
| 4,900,217 A | 2/1990 | Nelson | |
| 4,950,123 A | * 8/1990 | Brockhaus | 414/522 |
| 4,979,588 A | * 12/1990 | Pike et al. | 182/18 |
| 5,011,199 A | * 4/1991 | Lowe et al. | 292/92 |
| 5,046,913 A | 9/1991 | Domek et al. | |
| 5,160,236 A | 11/1992 | Redding et al. | |
| 5,205,010 A | * 4/1993 | Hageman | 14/71.1 |
| 5,257,894 A | * 11/1993 | Grant | 414/537 |
| 5,259,081 A | 11/1993 | Henderson | |
| 5,284,414 A | 2/1994 | Kempf | |
| 5,299,904 A | 4/1994 | Simon et al. | |
| 5,305,486 A | 4/1994 | Smith et al. | |
| 5,357,869 A | 10/1994 | Barjolle et al. | |
| 5,380,144 A | 1/1995 | Smith et al. | |
| 5,391,041 A | 2/1995 | Stanbury et al. | |
| 5,393,192 A | 2/1995 | Hall et al. | |
| 5,421,692 A | * 6/1995 | Varrichio et al. | 414/678 |
| 5,433,580 A | 7/1995 | Kempf | |
| 5,472,306 A | 12/1995 | Stoll et al. | |
| 5,544,998 A | * 8/1996 | Malinowski | 414/522 |
| 5,636,399 A | 6/1997 | Tremblay et al. | |
| 5,675,515 A | 10/1997 | January | |
| 5,829,945 A | * 11/1998 | Stanley | 414/477 |
| 5,832,555 A | * 11/1998 | Saucier et al. | 14/71.1 |
| 5,934,725 A | 8/1999 | Bowers | |

* cited by examiner

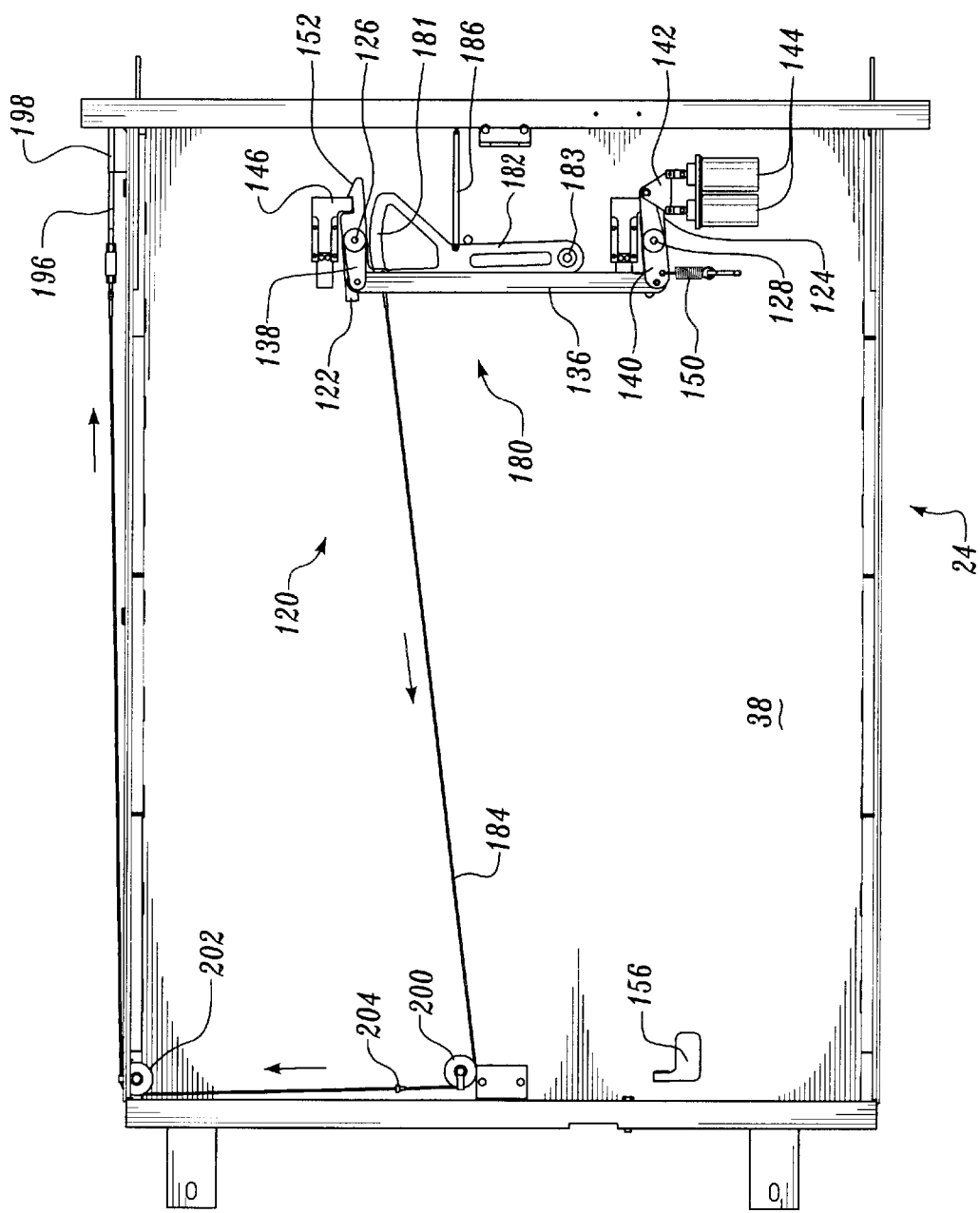

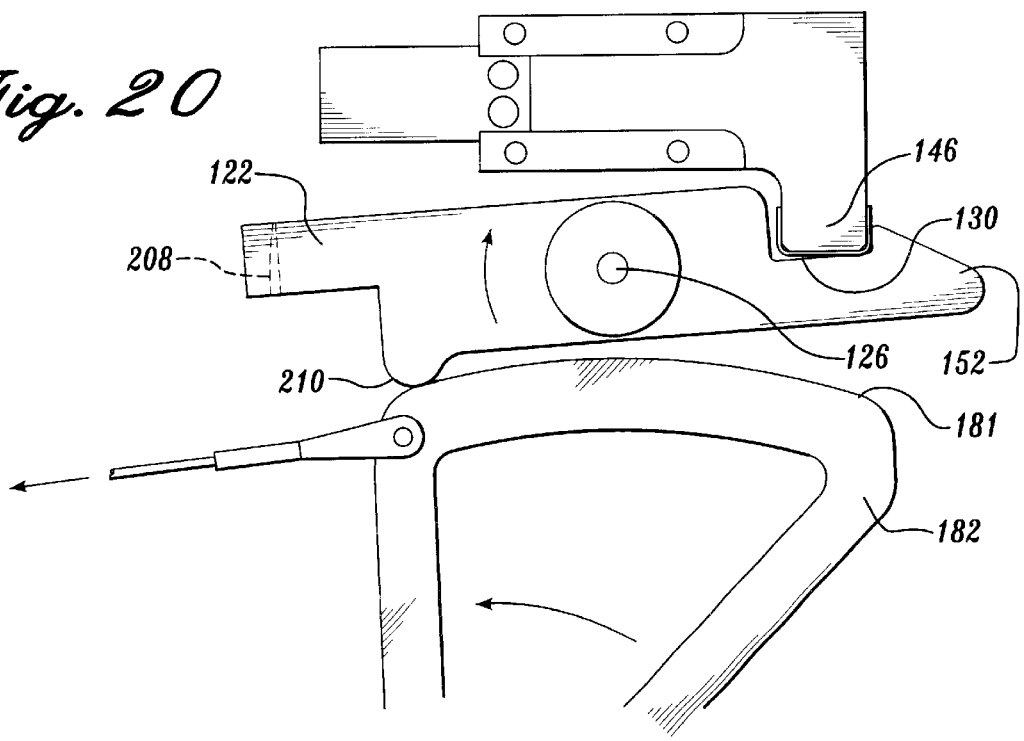
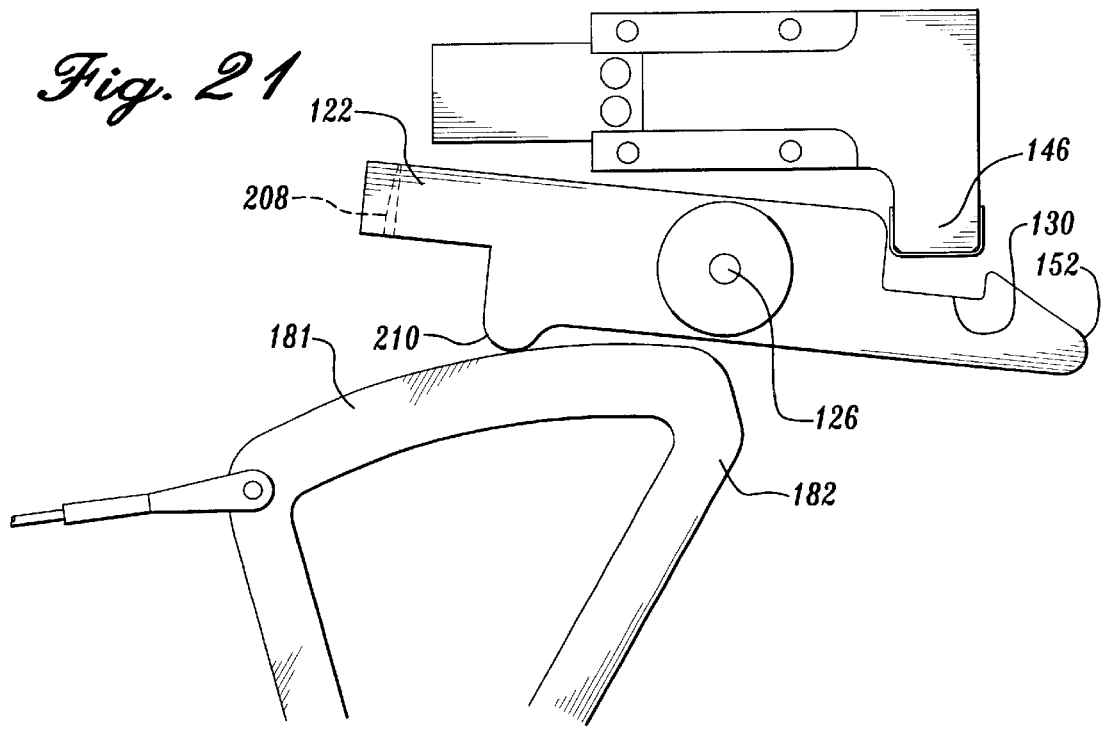

Fig. 43.

LOW FLOOR VEHICLE RAMP ASSEMBLY

REFERENCE TO RELATED APPLICATIONS

This is a continuation of U.S. patent application Ser. No. 09/164,434, filed Sep. 30, 1998, abandoned, which is a continuation-in-part of U.S. patent application Ser. No. 09/060,948, filed Apr. 15, 1998, now U.S. Pat. No. 6,186,733, both of which are incorporated herein by reference.

TECHNICAL FIELD OF THE INVENTION

This invention relates generally to retractable ramp platforms that facilitate boarding of a passenger onto a vehicle and, in particular, retractable ramp platforms that facilitate access to a low floor vehicle.

BACKGROUND OF THE INVENTION

Intra-city buses have included wheelchair lifts for transporting persons of limited mobility in and out of the vehicles. Typically, a prior art wheelchair lift included a mechanically driven platform to raise and lower a passenger between loading from outside of the vehicle at ground level and entry into the vehicle at a vehicle floor level. For example, wheelchair lifts of the type installed in the stairwell of transit vehicles, such as intra-city buses, have been used for some time. One type of prior art wheelchair lift, commonly referred to as a "step lift" was disclosed in U.S. Pat. No. 4,466,771 to Thorley et al. The step lift in Thorley et al. was designed to be installed in the stairwell of a transit vehicle, and included hinged panels that were movable between a step configuration and a platform configuration. In the step configuration, the hinged panels formed steps for use by passengers to board and exit the vehicle. In the platform configuration, the hinged panels formed a horizontal platform used to raise and lower a wheelchair passenger between a vehicle floor-level position and a ground-level position.

Municipalities recently began using "low floor buses." In this style of bus, a passenger entered the bus at a level that was above ground by a sufficient amount so that the chassis had proper ground clearance. The floor of the bus throughout the vehicle was substantially at this level. It was believed that such buses were more stable in operation, and permitted simpler egress and ingress of passengers.

A problem encountered with the low floor buses was that wheelchair lifts such as were disclosed in Thorley et al. could not be installed in the buses because there was not a stairwell. Moreover, the low floor buses lacked sufficient under-chassis space to mount the complex lifting mechanisms for a wheelchair lift. Therefore, other systems had to be developed to accommodate wheelchair users and other passengers of limited mobility. To address these concerns, some manufacturers developed ramp assemblies for providing limited mobility passengers access into and out of the low floor buses. The ramp assemblies were structures that selectively provided a ramp platform that extended between the outside ground and the floor of a vehicle such as an intra-city bus to provide access into and out of the vehicle.

Prior art ramp assemblies typically stowed the ramp platform under the vehicles when not in use, and deployed the ramp platform when it was necessary to provide passenger access. When the ramp platform was deployed, the two ends were positioned at different heights, creating a slope upward from the ground to the bus floor. An example of a ramp assembly for use in a low floor bus was disclosed in U.S. Pat. No. 5,636,399 to Tremblay et al. A similar ramp assembly for use in a van was disclosed in U.S. Pat. No. 5,393,192 to Hall et al.

One of the problems found in designing prior art ramp assemblies for low floor vehicles was the limited amount of space allotted for the ramp platform and its reciprocating mechanism, including the motor and necessary drive mechanism. Because the low floor buses lacked a stairwell and a raised floor under which the ramp assembly could be mounted, the designer was forced to minimize size in all dimensions to prevent loss of ground clearance or interference with other under-chassis structures. Tremblay et al. and Hall et al. addressed this problem by providing a compact ramp assembly. However, while the ramp assemblies disclosed in Tremblay et al. and Hall et al. were relatively small, the motors used for the ramps were mounted behind or underneath the frame for the ramp assembly, requiring additional installation area underneath the vehicle. There exists a need for a more efficient manner of mounting a motor for a ramp assembly.

Another problem with the prior art ramp assemblies was that the ramp platform was stowed several inches below the floor level and, to reach the deployed position, had to be raised to extend between the floor and the ground. Alternatively, some form of transition between the ramp in the deployed position and the floor had to be provided. Tremblay et al. addressed this problem by providing a hinged panel that formed a transition between the floor and the ramp platform. Hall et al., on the other hand, provided a complex tilting mechanism utilizing a reciprocating motor to lift the trailing end of the ramp to floor level. There is a need for a less complex mechanism for providing a transition between the floor and a ramp platform.

Another problem with prior art ramp assemblies is that, if power was cut to the reciprocating mechanism for the ramp platform, the ramp platform may be stuck in a deployed position. In such case, the driver of the bus would have to wait for maintenance crews to repair, or at least stow, the ramp platform. There is a need for a more simple way of retracting a ramp platform when the reciprocating mechanism for the ramp platform is inoperable.

SUMMARY OF THE INVENTION

The present invention solves many of the above problems by providing a novel ramp assembly for mounting on a vehicle. In accordance with one embodiment of the invention, the ramp assembly includes a frame for mounting below a floor of a vehicle and a ramp platform mounted in the frame. A reciprocating mechanism is provided for extending and retracting the ramp platform along a length of the frame between stowed and deployed positions. The ramp platform is stowed substantially along a plane, and is arranged when deployed such that the forward end of the ramp platform extends down toward the ground. The ramp platform includes means connected to the reciprocating mechanism for raising the trailing end of the ramp platform in one translational movement with the extension of the ramp platform, such that the trailing end of the ramp platform, when deployed, is raised above the plane.

In one embodiment, the means for raising includes a lever having a distal end attached to the trailing end of the ramp platform and a second end rotatably attached to the reciprocating mechanism. The lever is configured to rotate about the second end as the reciprocating mechanism is extended, thereby lifting the trailing end upward.

In a preferred embodiment, the frame includes an abutment surface that is engaged by the lever when the ramp platform is extended, the engagement of the abutment surface by the lever causing the lever to rotate. The abutment surface is preferably a pin, which is engaged by a slot on the lever when the ramp platform is extended. The slot is preferably curved, such that the curved slot causes a smooth translational lifting movement of the trailing end.

In accordance with one aspect of the invention, the frame includes a cam slot and the lever includes a cam follower, the cam slot and the cam follower being configured such that during extension of the ramp platform, the cam follower follows the cam slot and the lever engages the pin and the cam follower continues forward such that the lever is rotated to lift the trailing end of the ramp platform.

In accordance with another aspect of the invention, the reciprocating mechanism includes a motor. The motor is mounted for reciprocating movement with the ramp platform.

In yet another embodiment, a rod extends the length of the frame, and a power cord for supplying power to the motor is coiled around the rod and is attached at one end to the frame and at another end to the reciprocating mechanism.

In accordance with other aspects of the invention, a first locking mechanism is provided that locks the ramp platform into a fully deployed position, and a second locking mechanism is provided that locks the ramp platform into a fully stowed position. Actuation of a single manual release mechanism releases the first locking mechanism when the ramp assembly is in the fully deployed position and releases the second locking mechanism when the ramp platform is in the fully stowed position.

The first locking mechanism preferably includes a first latch arm operatively associated with the reciprocating mechanism to extend and retract with the ramp platform and a first latch plate attached to the frame that is engaged by the first latch arm when the ramp platform is in the fully deployed position. A second latch arm can be operatively associated with the reciprocating mechanism to extend and retract with the ramp platform that engages a second latch plate attached to the frame when the ramp platform is in the fully deployed position. The first locking mechanism is further associated with the second locking mechanism by means of a coupling arm, causing both first and second locking mechanisms to operate substantially simultaneously when actuated. The second locking mechanism preferably includes a third latch plate attached to the frame that is engaged by the second latch arm when the ramp platform is in the fully stowed position.

The single manual release mechanism preferably includes a handle (1) operatively associated with the first latch arm when the ramp platform is in the deployed position such that actuation of the handle causes both the first and second latch arms to release the first and second latch plates, and (2) operatively associated with the second latch arm when the ramp platform is in the stowed position such that actuation of the handle causes the second latch arm to release the third latch plate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 19 is a top plan view of the ramp assembly in FIG. 2, showing the latching mechanism of the present invention, with the rectangular motor plate and the ramp platform removed for detail, and the ramp assembly in the deployed position;

FIG. 20 is a detail view of the first latch plate of the latching mechanism in FIG. 19, with the latch pivot arms and the coupling arm removed for detail;

FIG. 21 is a detail view of the first latch plate in FIG. 20, with the latch arm manually actuated;

FIG. 43 is the belt release assembly in FIG. 39, with the belt release mechanism in the position shown in FIG. 42;

DETAILED DESCRIPTION OF THE PREFERRED EMBODIMENT

Figure 1:
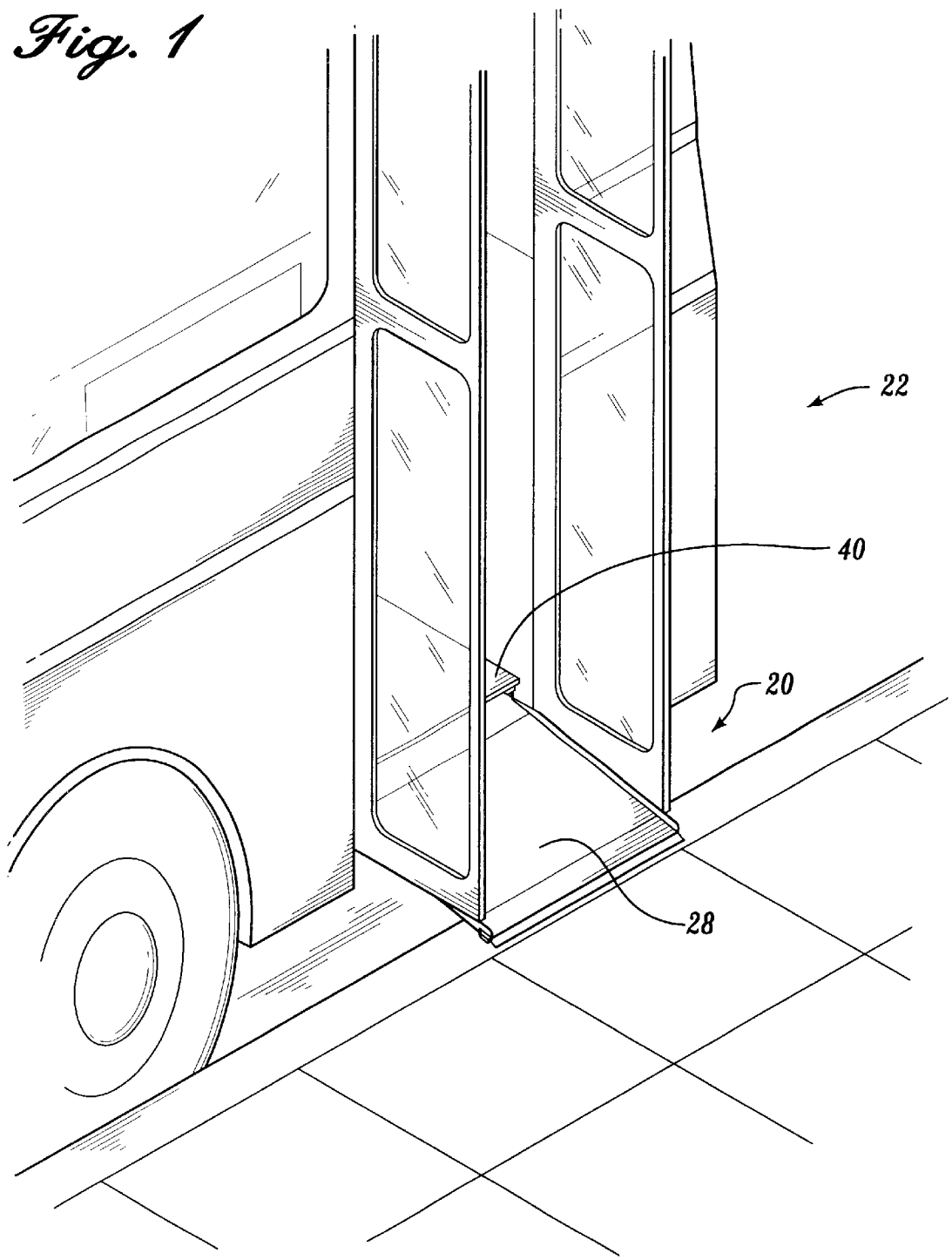
FIG. 1 is a partial side view of a low floor bus having a ramp assembly made in accordance with the present invention.
Figure 2:
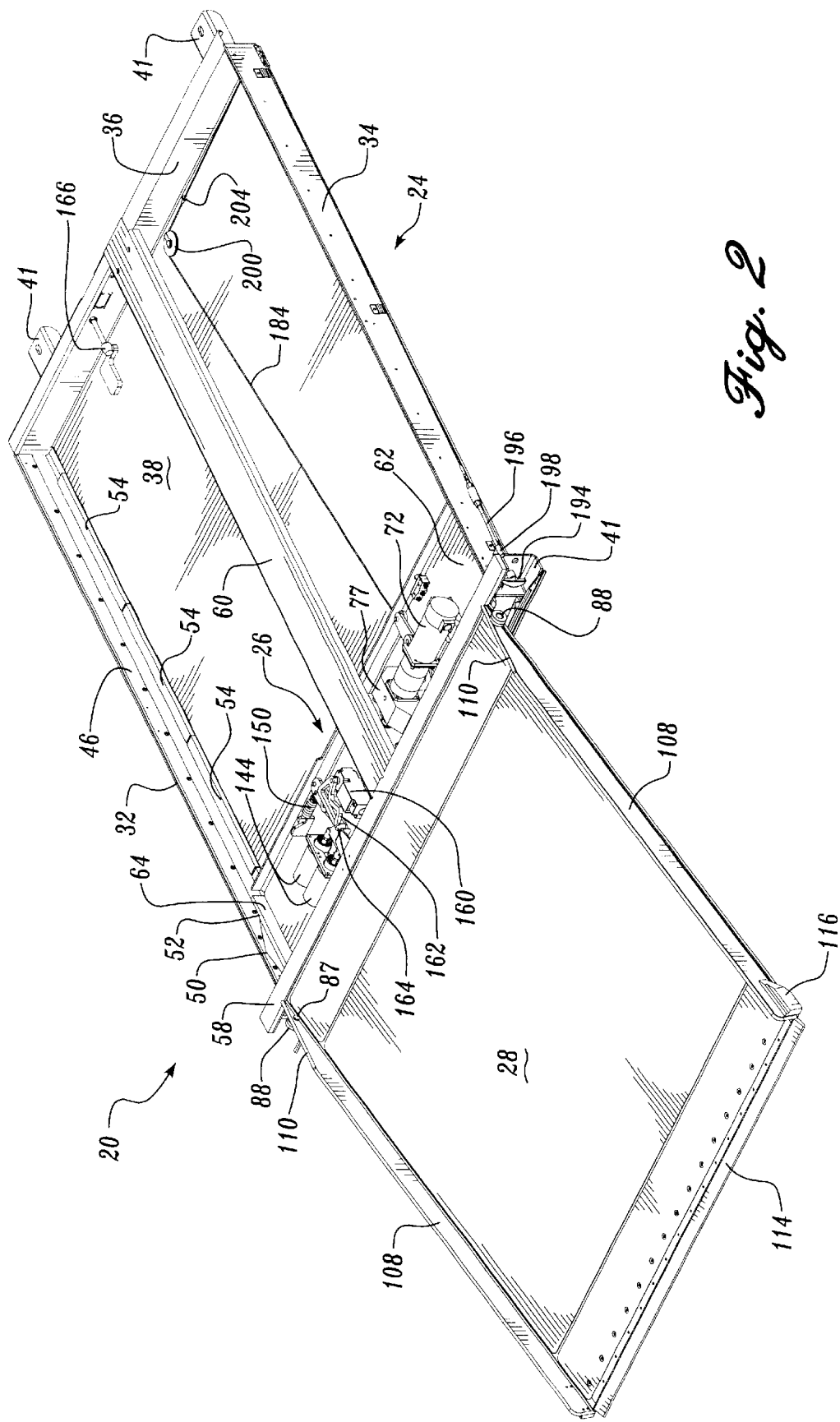
FIG. 2 is a front isometric view of the ramp assembly in FIG. 1, with the ramp assembly removed from the low floor bus, the ramp platform fully deployed, and the top panel removed for detail.

Referring now to the drawing, in which like reference numerals represent like parts throughout the several views, FIG. 2 shows a ramp assembly 20 for mounting in a low floor bus 22 (FIG. 1) or other vehicle. The ramp assembly 20 fits within a frame, in the drawings shown as a rectangular enclosure 24, that fits underneath the chassis of the low floor bus 22. The ramp assembly 20 includes a reciprocating mechanism 26 for moving a ramp platform 28 between a fully deployed position (FIG. 2) and a fully stowed position (FIG. 3).

Figure 3:
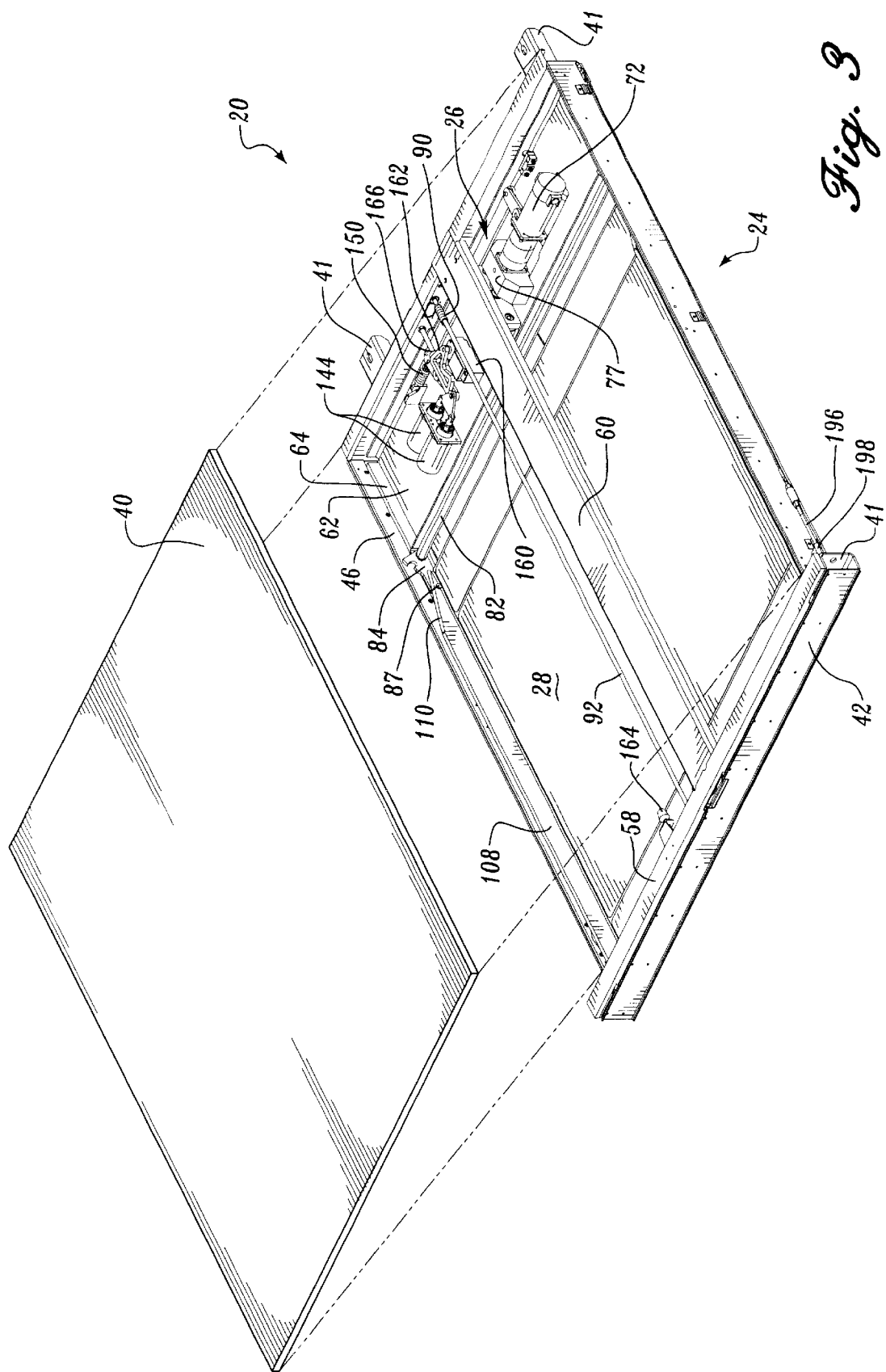
FIG. 3 is a front isometric view of the ramp assembly in FIG. 2, with the ramp platform fully stowed.

The rectangular enclosure 24 includes side panels 32, 34, an end panel 36, a bottom panel 38 and a removable top panel 40 (shown removed from and raised above the rectangular enclosure 24 in FIG. 3). The side panels 32, 34, the end panel 36, and the bottom panel 38 are a weldment that provides a structural frame to house the ramp platform 28 and the reciprocating mechanism 26 along the plane of the rectangular enclosure 24. Preferably, the side panels 32, 34 include bottom flanges (not shown) that provide structural support for the bottom panel 38. The top panel 40 functions as a cover for the rectangular enclosure 24 and, as described above, is removable. The rectangular enclosure 24 is attached below the doorway of the low floor bus 22 by brackets 41, welding or another method known in the art. When in place, the top panel 40 is located just below the floor of the doorway of the low floor bus 22 (FIG. 1).

Figure 8:
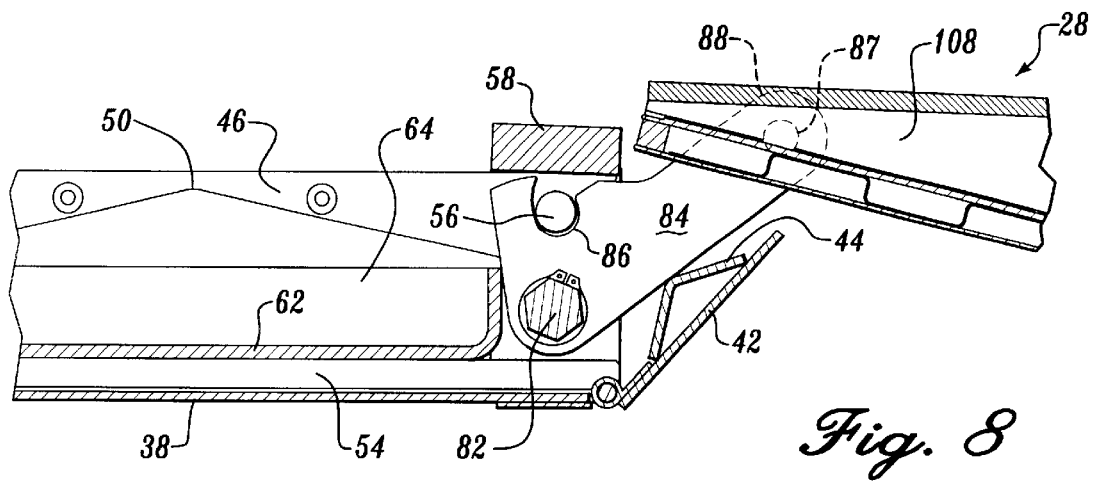
FIG. 8 is a partial sectional view taken along the section lines 6—6 in FIG. 5, with the rectangular motor plate and the ramp platform in position.

A hinged closure panel 42 (FIG. 3) is attached to the forward end of the rectangular enclosure 24 (opposite the end panel 36). The hinged closure panel 42 is hinged from the bottom panel 38 and is spring-loaded to the closed position. The hinged closure panel 42 includes V-shaped brackets 44 (FIG. 8) on its inner side, adjacent to the side panels 32, 34, and arranged so that the point of the V extends toward the end panel 36 when the hinged closure panel 42 is closed. As is described in detail below, the V-shaped brackets 44 are contacted by the ramp platform 28 at the beginning of deployment of the ramp platform so as to open the hinged closure panel 42.

Figure 6:
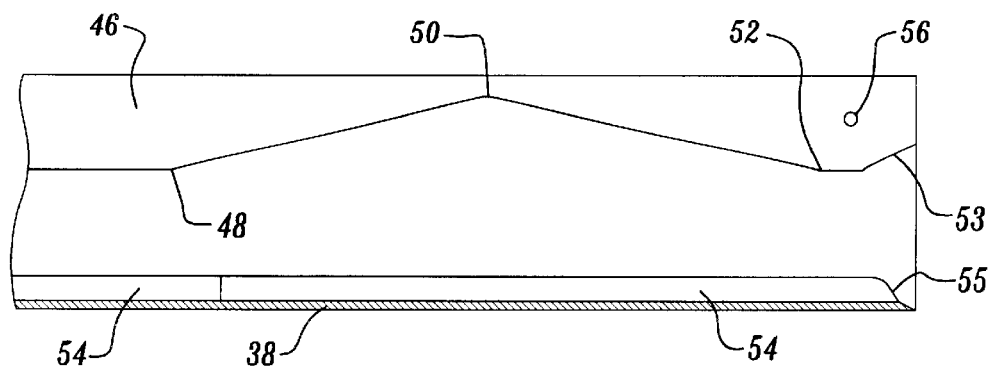
FIG. 6 is a sectional view of the rectangular enclosure for the ramp assembly in FIG. 1, taken along the sectional lines 6—6 in FIG. 5, with the rectangular motor plate and the ramp platform removed for detail.

FIG. 6 shows a side view of the inside of one of the side panels 34. The side panel 34 includes a guide bar 46 extending along an upper surface thereof. The outboard, or forward end of the guide bar 46 has a serpentine profile. Specifically, the guide bar 46 extends upward at a rear juncture 48 and continues upward to a peak 50 where the guide bar turns and extends downward to a forward juncture 52. Just forward of the forward juncture 52, the guide bar 46 tapers upward at a sloped front edge 53.

The outer edges of the bottom panel 38 include bottom flange support bearings 54 directly below the guide bars 46. The bottom flange support bearings 54 can rest on top of bottom flanges for the side panels 32, 34, if provided. The bottom flange support bearings 54 extend along the bottom panel 38 adjacent to the side panel 34 and underneath the guide bars 46, and are preferably manufactured from a low friction material such as Nylatron™ bearing material. The bearing material does not require lubrication, which improves reliability and reduces maintenance. The bottom flange support bearings 54 are preferably the same height along their lengths, with the exception of a tapered leading edge 55 (FIG. 6).

Cap screw heads, or pins 56 (FIG. 6), extend into the side panels 32, 34, and are located at the forward end of the rectangular enclosure 24 just above the forward juncture 52 of the guide bars 46. As described in detail below, the pins 56 act as abutment surfaces for rotating the trailing end of the ramp platform upward at the end of deployment of the ramp platform.

An upper cross-member 58 spans the width of the forward end of the rectangular enclosure 24. The upper cross-member 58 provides additional structural support for the rectangular enclosure 24, as well as threshold support for passenger foot traffic at the edge of the doorway for the low floor bus 22.

A structural channel 60 (FIG. 2) is located above the reciprocating mechanism 26 and the ramp platform 28, and is fixed between the rearward portion of the rectangular enclosure 24 (adjacent to the end panel 36) and the upper cross-member 58. The structural channel 60 provides longitudinal structure for the rectangular enclosure 24, as well as support for components of the reciprocating mechanism 26, as is described in detail below.

The reciprocating mechanism 26 includes a rectangular motor plate 62 having bearing strips 64 attached at its ends. The rectangular motor plate 62 is of sufficient length so as to rest on top of and run along the bottom flange support bearings 54 on opposite sides of the bottom panel 38. The bearing strips 64 are of sufficient height and shape to fit snugly between the guide bars 46, the rectangular motor plate 62, and the bottom flange support bearings 54. The bearing strips 64 are preferably manufactured from a low-friction material so that they freely slide along the top of the bottom flange support bearings 54 and bottom surface of the guide bars 46.

Figure 5:
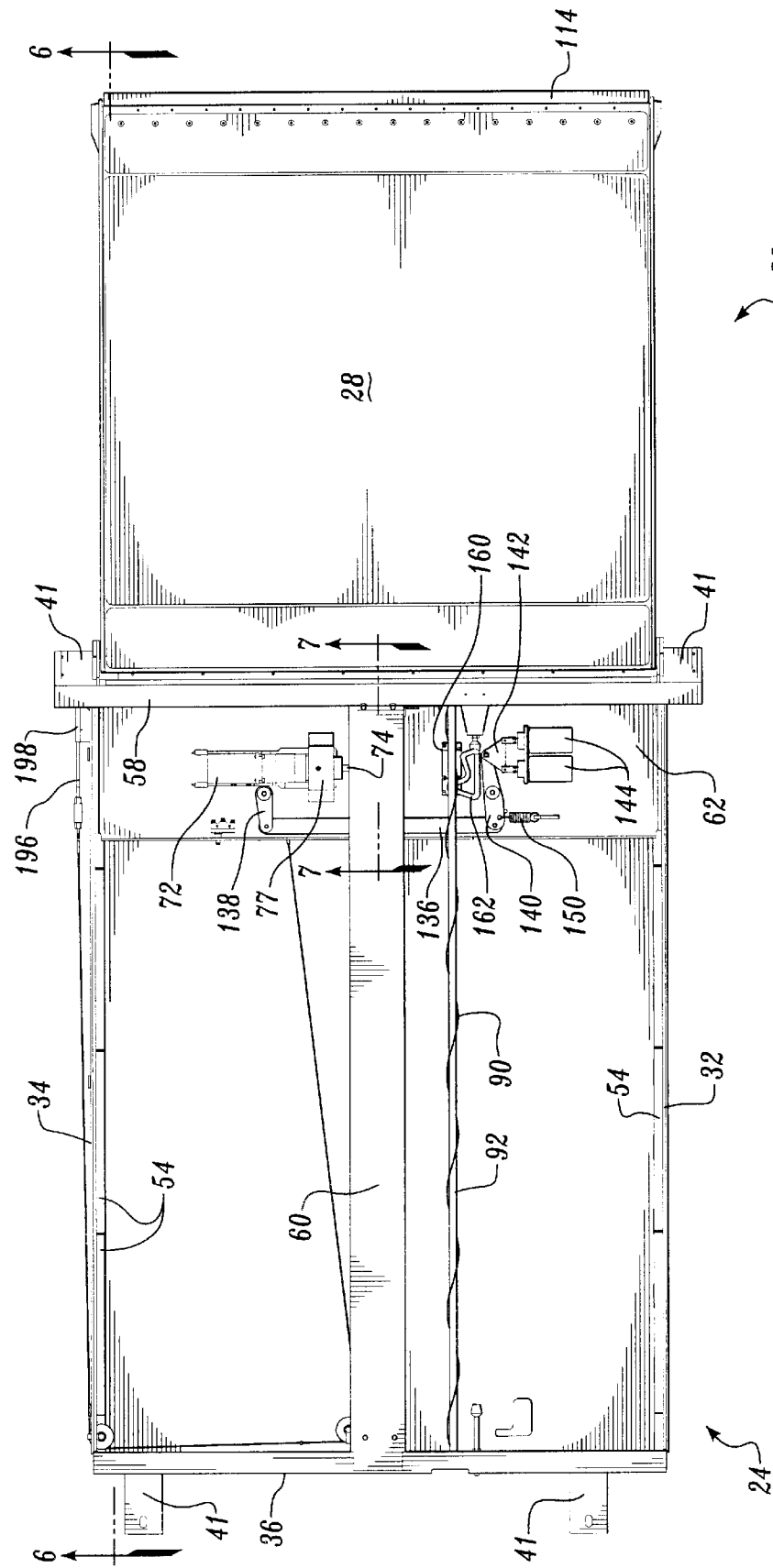
FIG. 5 is a top plan view of the ramp assembly in FIG. 2.

An electric motor 72 is attached to a motor mount 77, which is mounted on the rectangular motor plate 62 such that the motor extends lengthwise on the motor plate and such that a motor shaft (not shown) extending out of the electrical motor also extends lengthwise. A flexible coupling 74b connects the motor shaft to a drive shaft 74a (FIG. 5). Although the electric motor 72 is disclosed as being electric, it is to be understood that hydraulic, pneumatic, or other powered motors could be used. A drive pulley 76 (FIG. 7) is located on the drive shaft 74a. The drive shaft 74a is supported by bearings (not shown) pressed into a mounting plate 73 (FIG. 7) that is attached to the rectangular motor plate 62.

A pair of idler pulleys 78 (FIG. 7) are mounted on opposite sides of the drive pulley 76. The central axes of the idler pulleys 78 extend parallel to the central axis of the drive pulley 76. The idler pulleys 78 roll on stationary idler shafts 78a, using bearings (not shown).

Figure 7:
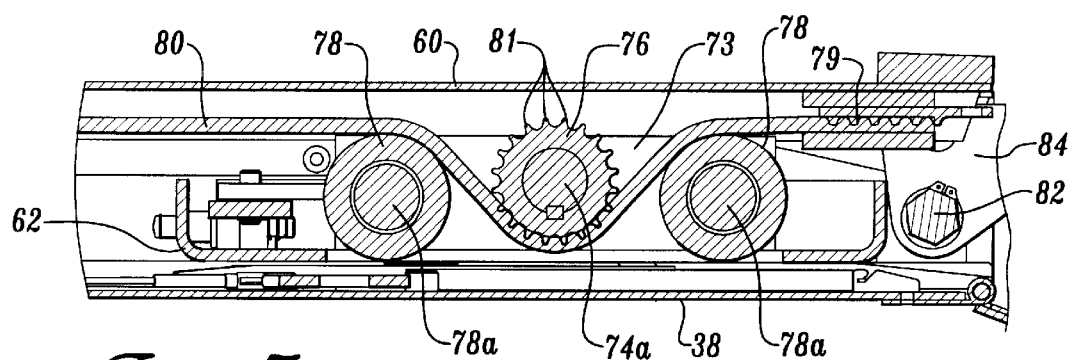
FIG. 7 is a partial sectional view taken along the sectional lines 7—7 in FIG. 5.

A drive belt 80 is fixed at both ends to opposite ends of the rectangular enclosure 24. The drive belt 80 includes ribs or holes (not shown) that are engaged by teeth 81 on the drive pulley 76 (FIG. 7). The drive belt 80 extends over both of the idler pulleys 78 and under the drive pulley 76, ensuring proper engagement of the drive belt 80 with the drive pulley 76. The forward end of the drive belt 80 is attached by a drive belt clamp 79 that is adjustable to tension the drive belt 80. The structural channel 60 provides support for the drive belt clamp 79, and serves as a cover for the drive belt 80.

Figure 4:
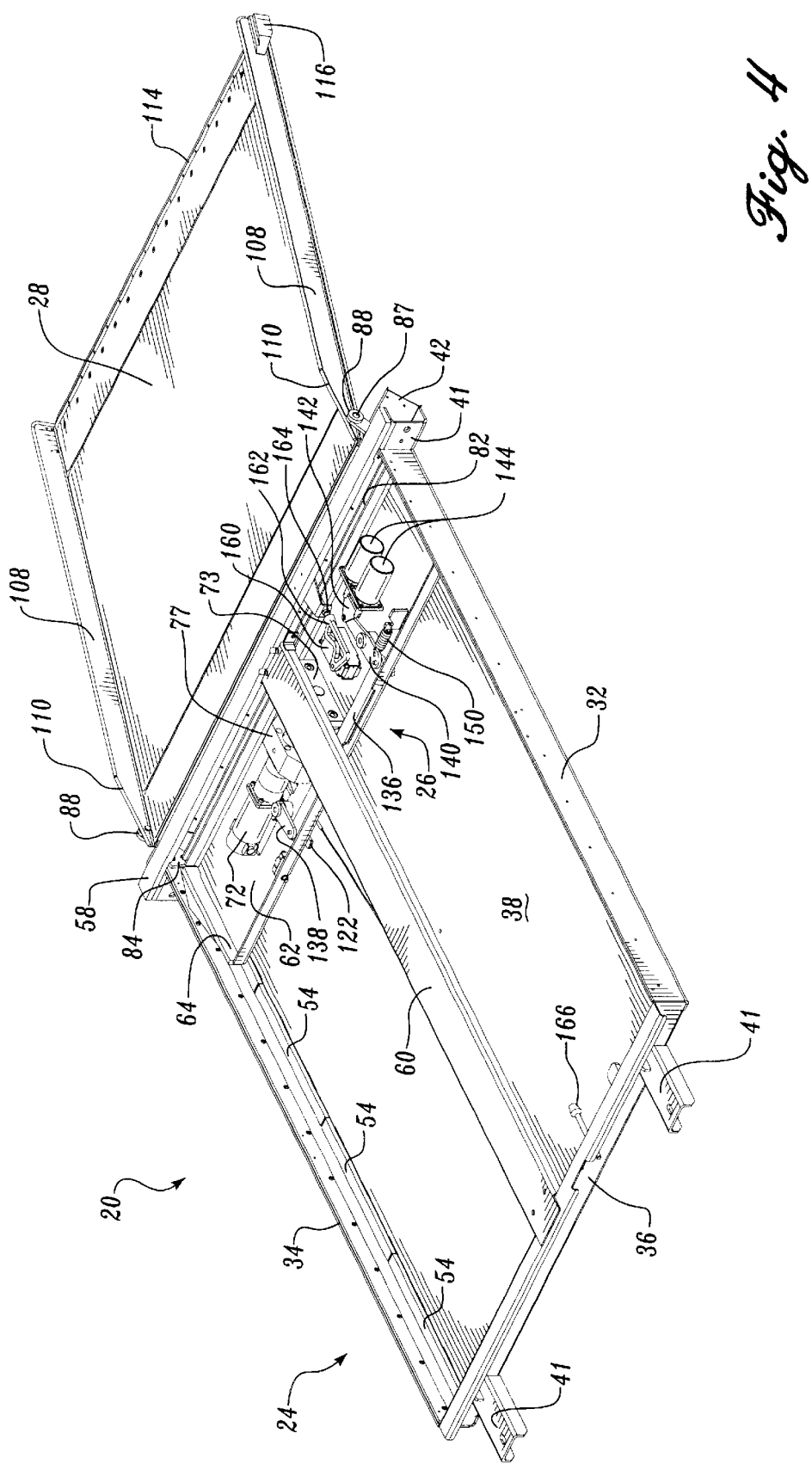
FIG. 4 is a rear isometric view of the ramp assembly in FIG. 2.

A torque shaft 82 (FIG. 3) extends along the forward edge of the rectangular motor plate 62 and is mounted for rotation in bores 64a in the forward end of the bearing strips 64. Lever arms 84 (FIG. 8) are mounted on opposite ends of the torque shaft 82 for rotation with the torque shaft. Each of the lever arms 84 is shaped like an elongate triangle with rounded edges. The pointed distal end of the elongate triangle faces forward, and the bottom opposite corner of the triangle is attached for rotation on the torque shaft 82. A curved slot 86 is located on the third corner of the triangle and faces upward. The triangular shape of the lever arm 84 causes the mouth of the curved slot 86 to face somewhat forward as well as upward. The pointed, forward end of each of the lever arms 84 is pivotally attached to trunnions 87 that are fixed to the sides of the ramp platform 28 near its rearward end (FIG. 4).

Each of the trunnions 87 includes a circular bearing 88 mounted thereon and attached to the associated lever arm 84. The circular bearing 88 functions as a cam follower located between and influenced by the guide bars 46 and the bottom bearing flange support 54.

A coiled electrical cable 90 (FIGS. 3 and 5 only) supplies power to the electrical motor 72 and other electrical components on the rectangular motor plate 62. The coiled electrical cable 90 wraps around a rod 92 that extends the length of the upper portion of the rectangular enclosure 24. The coiled electrical cable 90 is configured much like an extension spring, such that as the rectangular motor plate 62 travels back and forth through its range of motion, the coiled electrical cable compresses in the stowed position (FIG. 3), and stretches the length of the rectangular enclosure 24 in the deployed position (FIG. 5). During this extension and retraction, the coiled electrical cable 90 is supported and guided by the rod 92, which prevents the coiled electrical cable from becoming entangled in the reciprocating mechanism 26. If different types of motors are used, power (such as hydraulic fluid) can be supplied by a similar coiled supply line.

Figure 10:
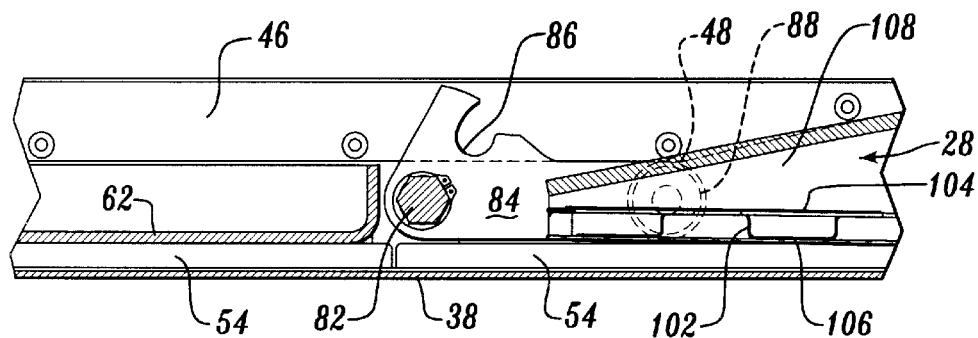
FIG. 10 is a partial sectional view similar to FIG. 8, with the ramp platform 14 inches retracted.

The ramp platform 28 is rectangular in shape and is of sufficient width to accommodate persons in wheelchairs and/or mobility aid devices. To minimize weight, the ramp platform 28 is preferably constructed of thin sheet metal having a corrugated sheet 102 (FIG. 10) extending between upper and lower sheets 104, 106. Alternatively, the ramp platform can be made of lightweight aluminum or a composite material of sufficient strength and stiffness to support the weight of passengers boarding the ramp platform 28. A non-skid material or other covering (not shown) can be used on the top surface of the ramp platform 28 to aid a passenger in loading the vehicle.

Stationary side curbs 108 extend along the outer edges of the ramp platform 28. The stationary side curbs 108 are preferably at least two inches in height, thereby preventing a wheelchair or a mobility aid device from rolling off of the sides of the ramp platform 28. The rearward, or inboard ends of the stationary side curbs 108 include bevels 110, which permit deployment of the ramp platform 28 without interference with the enclosure 24.

The ramp platform 28 includes a beveled leading edge 114 extending along the width of its forward end. The beveled leading edge 114 contacts the ground when the ramp platform 28 is fully deployed so as to provide a minimum threshold height when the wheels of a wheelchair roll onto the ramp platform.

Bearing blocks 116 are attached to the leading outside edges of the stationary side curbs 108. The bearing blocks 116 extend between the guide bars 46 and the bottom flange support bearings 54 when the ramp platform 28 is withdrawn to the stowed position. The bearing blocks 116 prevent the ramp platform 28 from rattling or bouncing within the enclosure as the vehicle travels down roadways.

Figure 22:
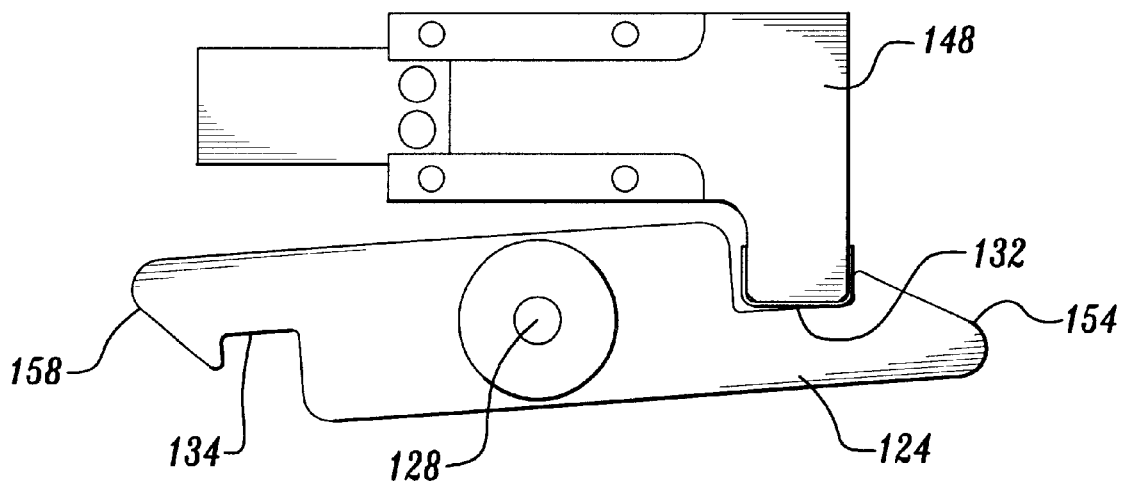
FIG. 22 is a detail view of the second latch plate of the latching mechanism in FIG. 19 with the latch pivot arms and the coupling arm removed for detail.

A latch mechanism 120 (FIGS. 19–28) is used to selectively hold the ramp platform 28 in the deployed or stowed positions. The latch mechanism 120 includes first and second latch arms 122, 124 (best shown in FIGS. 20 AND 22) extending underneath the rectangular motor plate 62 and pivotally mounted about their centers on pins 126, 128. The pins 126, 128 extend through orthogonal bores (not shown) in the left central and right central halves of the rectangular motor plate 62, respectively. Thus, the first and second latch arms 122, 124 travel with the rectangular motor plate 62 during extension and retraction of the ramp platform 28.

The first latch arm 122 includes a cutout 130 on the front, right end of the latch arm. The cutout 130 is spaced from the pin 126. The second latch arm 124 includes two cutouts 132, 134 located on opposite sides and on opposite ends of the second latch arm. Both of these cutouts 132, 134 are spaced from the pin 128.

Movement of the two latch arms 122, 124 is tied by a coupling arm 136, a short pivot arm 138, and a long pivot arm 140. The short pivot arm 138 is attached for rotation with the first latch arm 122 by the pin 126, and extends above the rectangular motor plate 62 parallel with the rearward portion of the first lever arm 122. The long pivot arm 140 is fixed for rotation with the second latch arm 124 by the pivot pin 128, and extends above the rectangular motor plate 62 parallel with the second latch arm 124. The coupling arm 136 is rotatably attached to the distal, rearward ends of the short pivot arm 138 and long pivot arm 140. The opposite end of the long pivot arm 140 is attached to the apex of a triangular plate 142. The base of the triangular plate 142 is attached to the actuating arms on a pair of solenoids 144.

Actuation of the solenoids 144 causes the long pivot arm 140 to rotate, which through the coupling arm 136 causes the short pivot arm 138 to rotate. Because the short pivot arm 138 is fixed for rotation with the latch arm 122, and the long pivot arm 140 is fixed for rotation with the latch arm 124, rotation of the short and long pivot arms 138, 140 causes a corresponding rotation of the latch arms 122, 124.

The cutout 130 in the latch arm 122 and the cutout 132 in the latch arm 124 are configured so as to extend over protrusions on deployed latch plates 146, 148 located at the forward end of the bottom panel 38. The deployed latch plates 146, 148 lie below the path of the rectangular motor plate 62 and the ramp platform 28.

Figure 23:
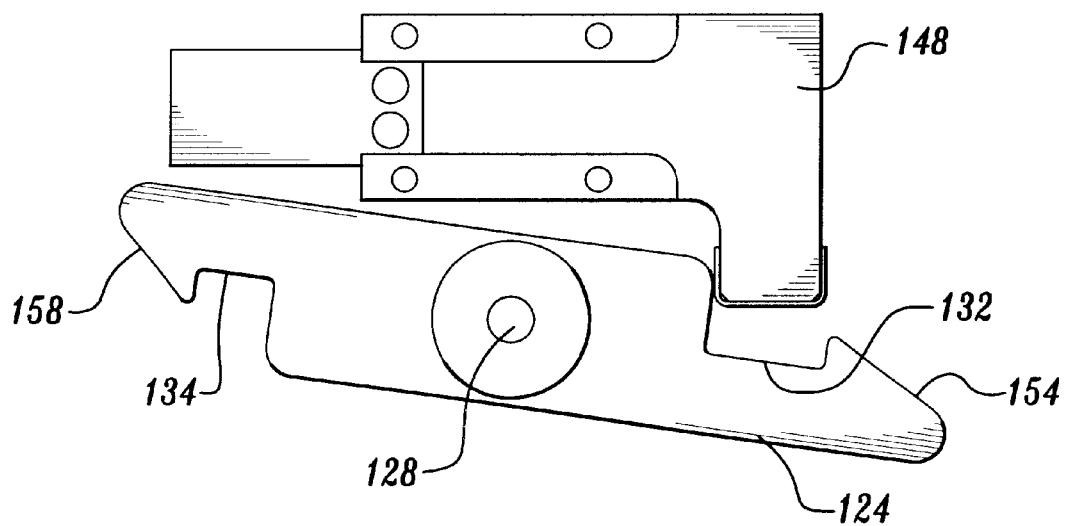
FIG. 23 is a detail view of the second latch plate in FIG. 20, with the latch arm manually actuated.

When the ramp platform 28 is fully deployed, the cutouts 130, 132 extend over the deployed latch plates 146, 148 (FIGS. 20 AND 22), preventing movement of the rectangular motor plate 62 and the ramp platform 28. In this manner, the latch mechanism 120 acts as a dual locking mechanism to hold the rectangular motor plate 62 and the ramp platform 28 in the deployed position. A spring 150 is attached to the rearward, distal end of the long pivot arm 140, and biases the latch arms 122, 124 toward counterclockwise rotation so that cutouts 130, 132 maintain locking engagement with the deployed latch plates 146, 148. To overcome this locking engagement, the solenoids 144 are actuated, causing the triangular plate 142 to retract and rotate the latch arms 122, 124 in the clockwise direction, thereby releasing the deployed latch plates 146, 148 from the cutouts 130, 132 (FIGS. 21 and 23).

The latch arms 122, 124 include rounded front ends having tapered leading sections 152, 154. The tapered leading sections 152, 154 cause the latch arms 122, 124 to engage and roll over the deployed latch plates 146, 148 as the rectangular motor plate 62 and the ramp platform 28 are extended to the deployed position. The tapered leading sections 152, 154 continue to rotate the latch arms 122, 124 until the cutouts 130, 132 snap into place onto the deployed latch plates 146, 148 when the ramp platform 28 is fully deployed.

The cutout 134 on the rearward end of the latch arm 124 is configured to fit over a stowed latch plate 156 at the rearward portion of the rectangular enclosure 24. The stowed latch plate 156 is located on the bottom panel 38, and is sized so as to fit under the rectangular motor plate 62 when the ramp platform 28 is stowed. The rearward edge of the second latch arm 124 includes a tapered trailing section 158 designed to engage and roll over the latch plate 156 during retraction of the ramp platform 28. Thus, the engagement of the cutout 134 with the stowed latch plate 156 acts as a locking mechanism to hold the ramp platform 28 and rectangular motor plate 62 in position when the ramp platform is in the stowed position.

Figure 9:
FIG. 9 is a sectional view similar to FIG. 6, with the rectangular motor plate and the ramp platform in position, and the ramp platform fully stowed.

In use, the low floor bus 22 reaches a destination and the ramp platform 28 is deployed. During travel, the ramp platform 28 is maintained in the stowed position (FIG. 9), and is held in place by the contact of the cutout 134 of the second latch arm 124 on the stowed latch plate 156. To deploy the ramp platform 28, the driver of the low floor bus 22 presses a deploy switch (not shown), which actuates the solenoids 144, releasing the cutout 134 from the stowed latch plate 156. Then, the electric motor 72 is powered causing the drive pulley 76 to rotate. Rotation of the drive pulley 76 causes the drive pulley 76 to move along the drive belt 80, advancing the rectangular motor plate 62 and the ramp platform 28 within the rectangular enclosure 24. At the beginning of this movement, the leading end of the ramp platform 28 engages the V-shaped bracket 44 on the hinged closure panel 42, causing the hinged closure panel to swing downward and expose the inside of the rectangular enclosure 24. During the beginning of extension of the ramp platform 28 and the rectangular motor plate 62, the bearing blocks 116 move along and between the guide bars 46 and the bottom flange support bearings 54. The bearing blocks 116 extend beyond the end of the guide bars 46 and the bottom flange support bearings 54 after a short extension of the ramp platform 28.

During extension of the ramp platform 28 and the rectangular motor plate 62, the bearing strips 64 on the outer edges of the rectangular motor plate are guided below the lower surface of guide bars 46, and ride along the upper surface of the bottom flange support bearings 54. In addition, the outer edges of the rectangular motor plate 62 and the outer side edges of the ramp platform 28 ride along the upper surface of the bottom flange support bearings 54. The circular bearings 88 are trapped between the bottom flange support bearings 54 and the guide bars 46 during this extension.

As the ramp platform 28 extends outward and more than half of the ramp platform extends out of the rectangular enclosure 24, the weight of the forward end of the ramp platform cantilevers the rearward end of the ramp platform upward around the tapered leading edge 55 of the bottom flange support bearings 54, pressing the circular bearing 88 upward against the lower surface of the guide bars 46. The serpentine profile of the lower edge of the guide bars 46 causes the circular bearings 88 to act as cam followers that engage and are influenced by the serpentine profile to control the ramp platform's angle with respect to the rectangular enclosure 24.

As the circular bearings 88 reach the rear junctures 48 of the guide bars 46 (FIG. 10), the circular bearings begin an upward climb toward the peak 50 of the guide bars. The torque shaft 82, however, remains adjacent to the bottom flange support bearings 54 because the torque shaft is attached to the bearing strips 64, which are confined from movement upward by the lower surface of the guide bars 46.

Figure 11:
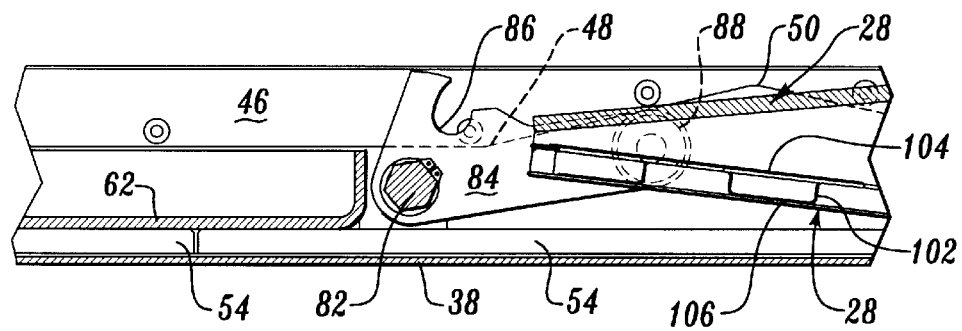
FIG. 11 is a partial sectional view similar to FIG. 8, with the ramp platform 11 inches retracted.

Thus, the lever arms 84 rotate about the torque shaft 82 so that the curved slots 86 extend almost straight upward relative to the rectangular motor plate 62 (FIG. 11).

Figure 12:
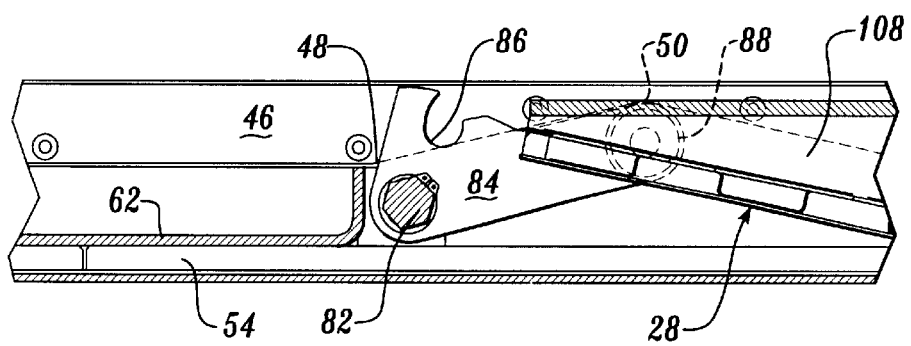
FIG. 12 is a partial sectional view similar to FIG. 8, with the ramp platform 9 inches retracted.
Figure 13:
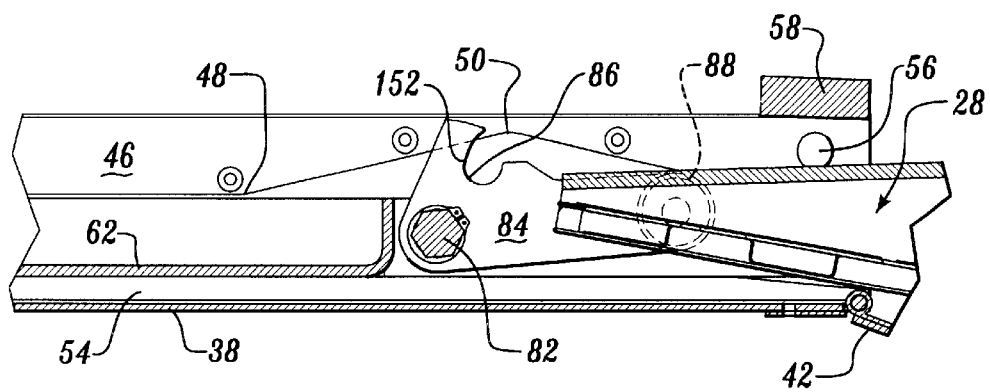
FIG. 13 is a partial sectional view similar to FIG. 8, with the ramp platform 6 inches retracted.
Figure 14:
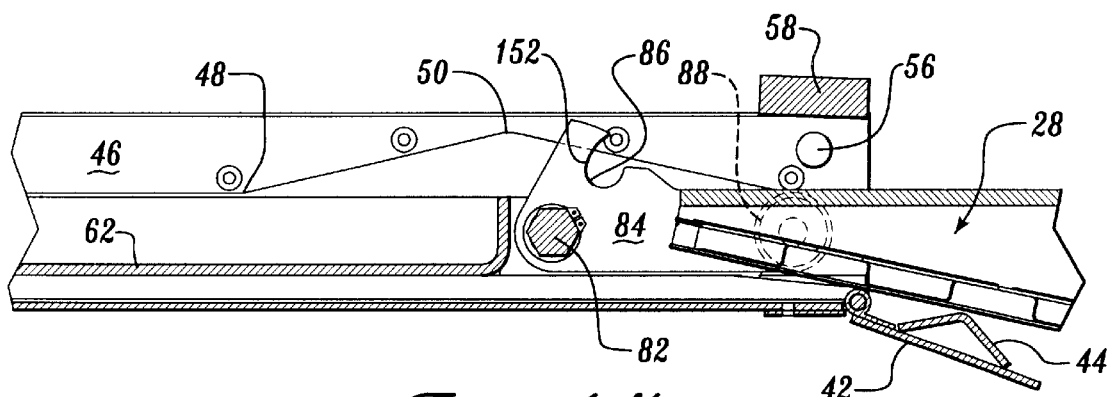
FIG. 14 is a partial sectional view similar to FIG. 8, with the ramp platform 4 inches retracted.

After the circular bearings 88 have reached the peaks 50 (FIG. 12), the circular bearings begin a downward motion (FIG. 13) toward the forward junctures 52 (FIG. 14). When the circular bearings 88 reach the peaks 50, the angle of the ramp platform 28 with the bottom panel 38 is the same as the angle of the section of the guide bars 46 between the peak 50 and forward juncture 52 with the bottom panel. Thus, as the circular bearings 88 move downward toward the forward junctures 52, the ramp platform 28 extends in a linear manner along an angle which is equal to the lower surface of the guide bars 46.

Figure 15:
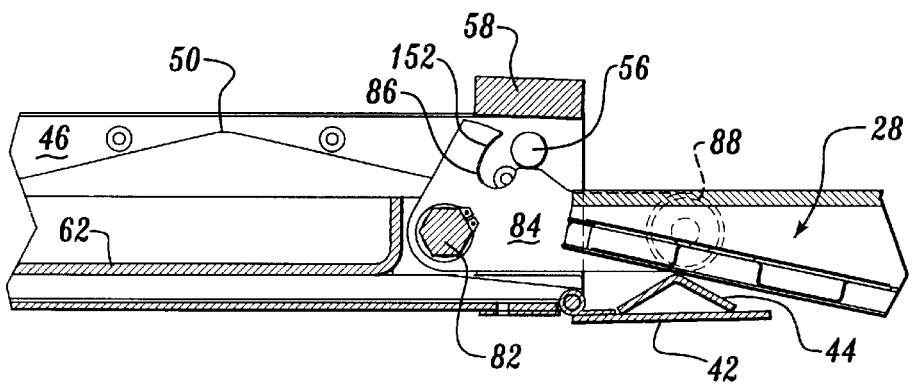
FIG. 15 is a partial sectional view similar to FIG. 8, with the ramp platform 1¼ inch retracted.
Figure 16:
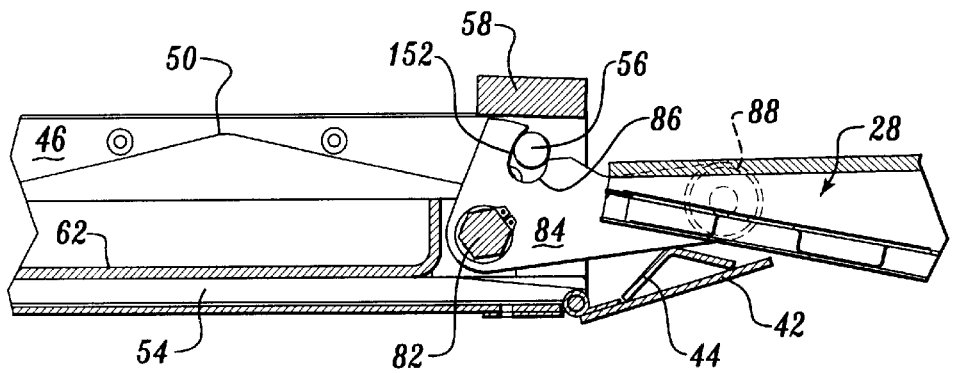
FIG. 16 is a partial sectional view similar to FIG. 8, with the ramp platform ¾ inch retracted.
Figure 17:
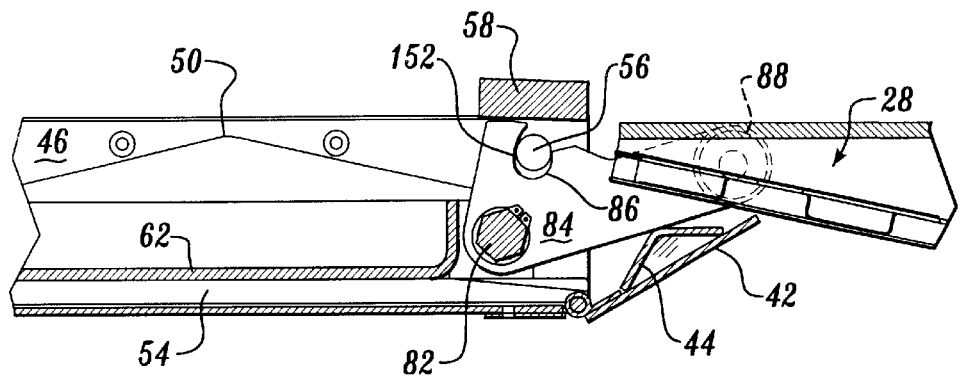
FIG. 17 is a partial sectional view similar to FIG. 8, with the ramp platform 1½ inch retracted.
Figure 18:
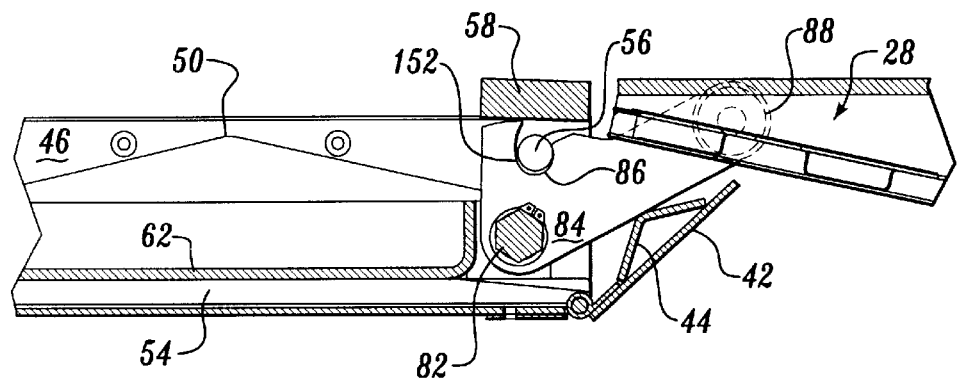
FIG. 18 is a partial sectional view similar to FIG. 8, with the ramp platform ¼ inch retracted.

As the ramp platform 28 approaches the last few inches of the deployment, the circular bearings 88 extend beyond the ends of the guide bars 46 and the bottom flange support bearings 54 (FIG. 15). By this time, the beveled leading edge 114 of the ramp platform 28 is resting on the ground. After a little more advancement of the ramp platform 28, the curved slots 86 on each of the lever arms 84 engage the pins 56 (FIG. 16). The pins 56 act as abutment surfaces for engaging and rotating the lever arms 84. The engagement of the curved slots 86 with the pins 56 stops advancement of the top portions of the lever arms 84, causing the lever arms to rotate about the torque shaft 82. As is shown sequentially in FIGS. 17, 18, and 8, the lever arms 84 continue to rotate, lifting the trailing end of the ramp platform 28 upward until the trailing end of the ramp platform is aligned with the upper cross-member 58.

During the final advancement of the ramp platform 28, the lever arms 84 contact the V-shaped brackets 44 on the hinged closure panel 42, causing the hinged closure panel to pivot downward clear of the underside of the deployed ramp platform 28. In addition, the leading edges of the bearing strips 64 are captured between the forward juncture 52 of the guide bars 46 and the bottom flange support bearings 54. This capturing adds stability to the fully-deployed ramp platform 28. When the ramp platform is fully deployed, the latch arms 122, 124 lock onto the deployed latch plates 146, 148.

The curved slots 86 are toleranced to influence control of the pivot of the lever arms 84 during travel. Specifically, the curved slots 86 and the lever arms 84 are arranged so that the trailing end of the ramp platform 28 moves substantially straight upward and downward after the bearings 88 have extended beyond the end of the guide bars. During this movement, concave rear surfaces 152 of the curved slots 86 move along the pins 56. This movement helps in retracting the ramp platform 28, because it forces the lever arms 84 to pivot downward and not rely on gravity. The torque shaft 82 provides continuity from one lever arm 84 to the other should non-uniform loads be applied to the ramp platform 28.

As can be best seen in FIG. 6, the serpentine profile of the guide rail 46 and the substantially straight configuration of the bottom flange support bearings 54 creates a gap 154 between the guide rail and the bottom flange support bearings underneath the peak 50. The gap 154 permits free movement of the circular bearings 88 between the guide rail 46 and the bottom flange support bearings 54 so that the ramp platform 28 can extend at a variety of different angles relative to the rectangular enclosure 24. This freedom of movement of the circular bearings 88 permits the ramp platform 28 to extend in a variety of different angles relative to the rectangular enclosure 24, allowing the ramp platform 28 to be deployed onto surfaces having varying heights. If the leading end of the ramp platform 28 comes into contact with the ground, the weight of the ramp platform no longer cantilevers the circular bearings 88 into contact with the guide rail 46. Instead, the circular bearings 88 lower toward the bottom flange support bearings 54 and the ramp platform 28 continues to extend, with the leading edge of the ramp platform dragging on the ground, until the ramp platform is fully extended. In this manner, the ramp platform 28 can be deployed onto different surfaces having varying heights.

As is best shown in FIG. 5, a limit switch 160 is located on the rectangular motor plate between the solenoids 144 and the electrical motor 72. The limit switch 160 includes an arm 162 that engages a first stop 164 (near the upper cross member 58, FIG. 3) upon full deployment of the ramp platform 28, and a second stop 166 (adjacent the end panel 36, FIG. 4) upon full retraction of the ramp platform 28. The limit switch 160 signals the control logic system for the ramp assembly 20 that the ramp platform is in the fully stowed or fully deployed positions. Once the ramp platform 28 is in either position, power is disconnected from the electrical motor 72.

To retract the ramp platform 28, the driver actuates a "stow" button (not shown), which causes the solenoids 144 to actuate and release the latch arms 122, 124 from the deployed latch plates 146, 148. Then, the electric motor 72 is powered causing the drive pulley 76 to rotate. Rotation of the drive pulley 76 causes the drive pulley to move along the drive belt 80, causing the rectangular motor plate 62 to move backward, rotating the lever arms 84, and thereby lowering the rearward end of the ramp platform 28. As described above, the front edge of the guide bars 46 include a sloped front edge 53 so as to direct the circular bearings 88 to between the guide bar and the bottom flange support bearing 54. The tapered leading edge 55 of the bottom flange support bearings 54 also helps to guide the circular bearings 88 into the cam slots formed by the guide bars 46 and the bottom flange support bearings 54.

Once the pins 56 are released from the curved slots 86 of the lever arms 84, the lever arms 84 cease rotation, and the ramp platform 28 begins retraction. As the ramp platform 28 is retracted, the circular bearings 88 once again engage the lower surfaces of the guide bars 46, and move along the serpentine path of the guide bars until at least half of the ramp platform 28 is within the rectangular enclosure 24, and the weight of the ramp platform is upon the bottom flange support bearings 54. During this movement, the rectangular motor plate 62 continues to retract and pull the ramp platform 28 toward the rear portion of the rectangular enclosure 24. The latch arm 124 eventually engages and rolls over the stowed latch plate 156, and locks in place. The limit switch 160 is engaged by the stop 166, and power is cut to the electrical motor 72. At the end of the retraction of the ramp platform 28, the hinged closure panel 42 closes. The stowed ramp platform 28 is now ready for travel.

On occasions when electrical power to the ramp assembly 20 should fail, a manual unlatching mechanism 180 enables the operator to release the ramp platform 28 from the deployed or stowed positions. The operator may then push the ramp platform 28 rearward to stow it in the rectangular enclosure 24. Alternatively, if electrical power is unavailable, a mechanic can operate the manual unlatching mechanism 180 to release the ramp platform 28 in order to physically extend the ramp platform for servicing.

The manual unlatching mechanism 180 (FIG. 19) includes a cam lever 182 located adjacent to and between the deployed latch plates 146, 148. The cam lever 182 is pivotally attached at one end to a pin 183 that is fixed to the bottom panel 38. The opposite end of the cam lever 182 includes a convex surface 181.

Figure 24:
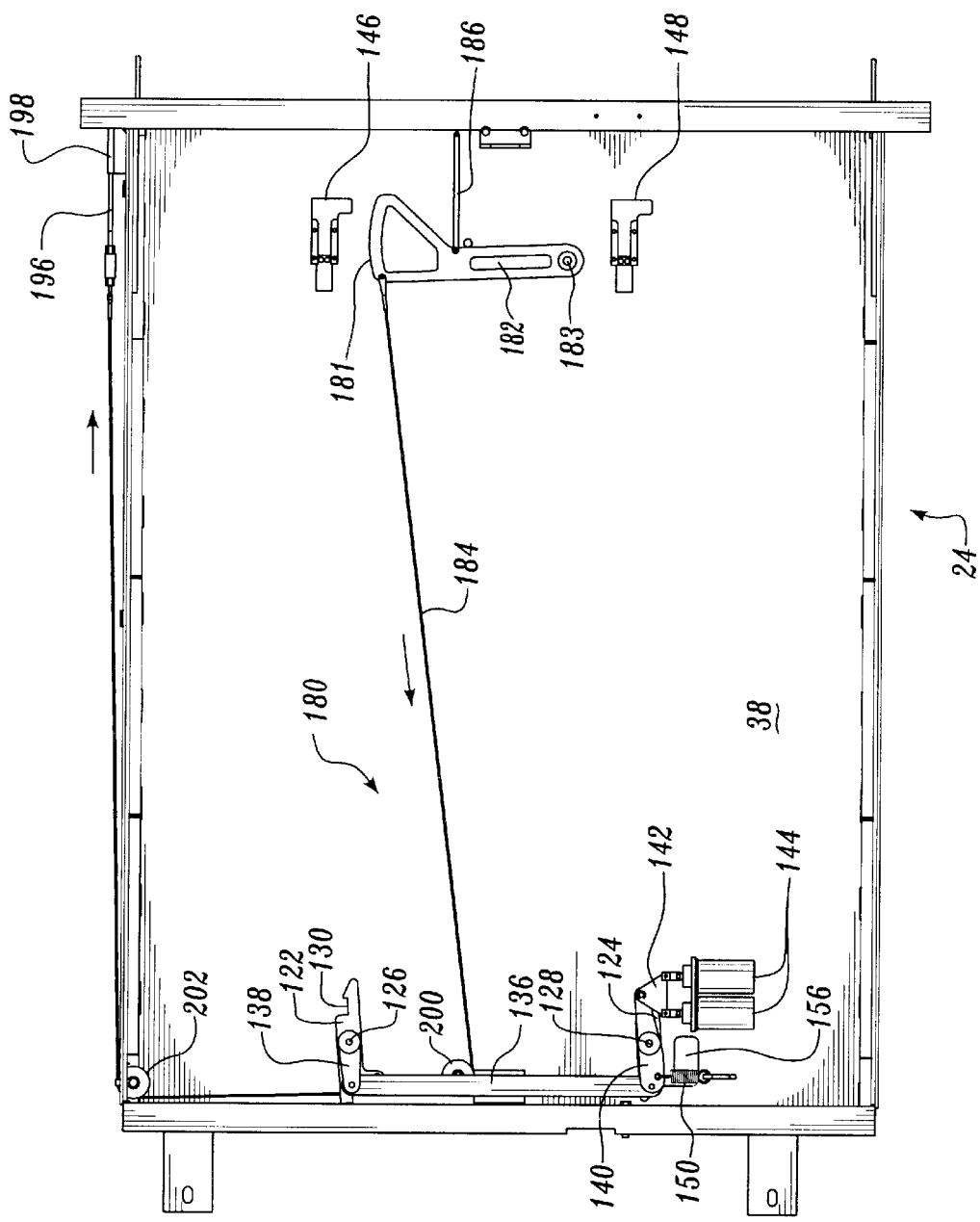
FIG. 24 is a top plan view similar to FIG. 19, with the ramp assembly in the stowed position.

A wire cable 184 is attached to the rear end of the cam lever 182. The forward end of the cam lever 182 is attached to an extension spring 186 (FIG. 24). The wire cable 184 is attached at an opposite end to a T-handle 194 (FIG. 2) having a threaded rod 196. The threaded rod 196 (FIG. 19) is inserted through and supported by a guide tube 198 attached to the rectangular enclosure 24. The guide tube 198 also limits the full stroke of the T-handle 194 by its length. The wire cable 184 extends rearwardly from the cam lever 182 along the top surface of the bottom panel 38 and wraps around a wire rope pulley 200 located at the end panel 36 adjacent the structural channel 60. From the wire rope pulley 200, the wire cable 184 extends along the rearward interior of the rectangular enclosure 24 to a second wire rope pulley 202 that extends partly through an opening in the rearward portion of the side panel 34. At the second wire rope pulley 202, the wire cable 184 exits the rectangular enclosure 24 and extends toward the forward end of the rectangular enclosure terminating at the threaded rod 196.

The wire cable 184 includes a wire rope ball shank 204 swaged to the wire cable along the rearward interior of the rectangular enclosure, between the two wire cable pulleys 200, 202, adjacent to the location where the latch arm 122 extends when the ramp platform 28 is in the stowed position. The latch arm 122 includes a V-notch 208 at its rearward end which is designed to capture the wire cable 184 when the ramp platform 28 is retracted to the stowed position.

Figure 25:
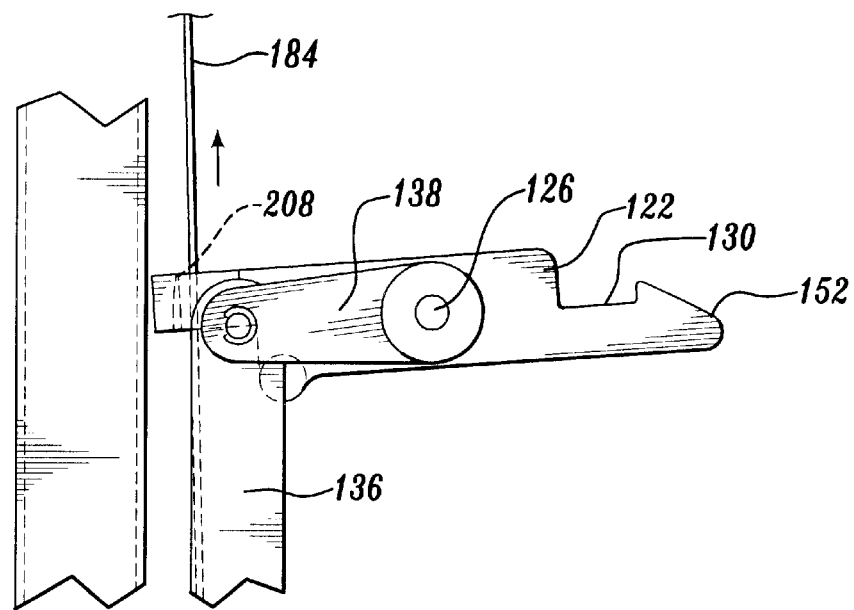
FIG. 25 is a detail view of the first latch arm in FIG. 24.
Figure 26:
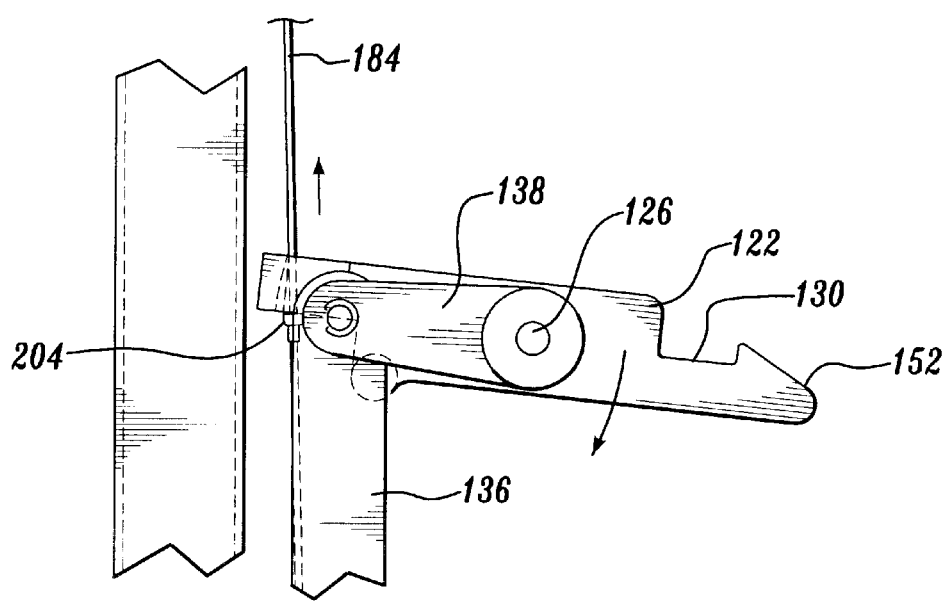
FIG. 26 is a detail view of the first latch arm in FIG. 25, with the latch arm manually actuated.
Figure 27:
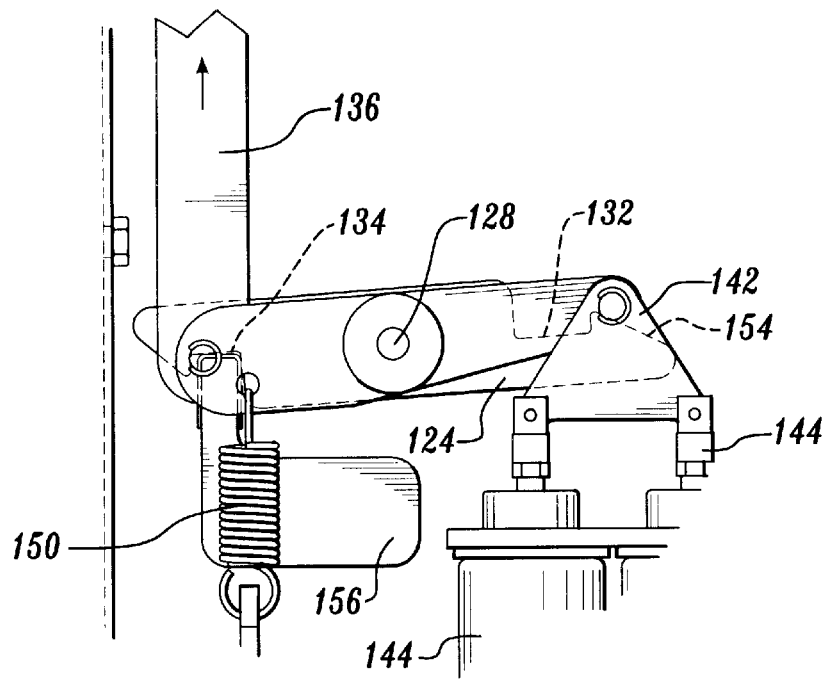
FIG. 27 is a detail view of the second latch arm in FIG. 24.
Figure 28:
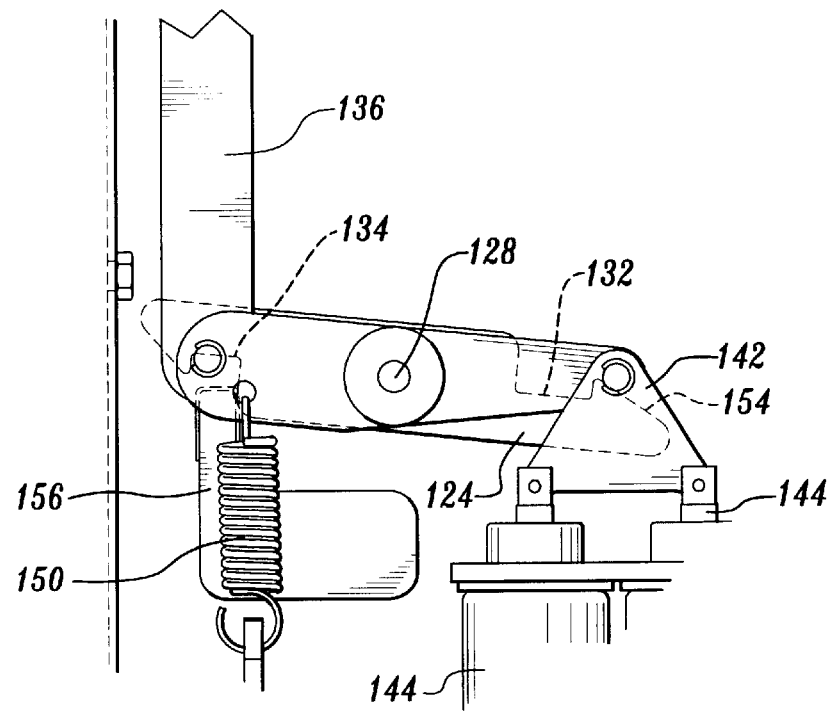
FIG. 28 is a detail view of the second latch arm in FIG. 25, with the latch arm manually actuated.
Figure 29:
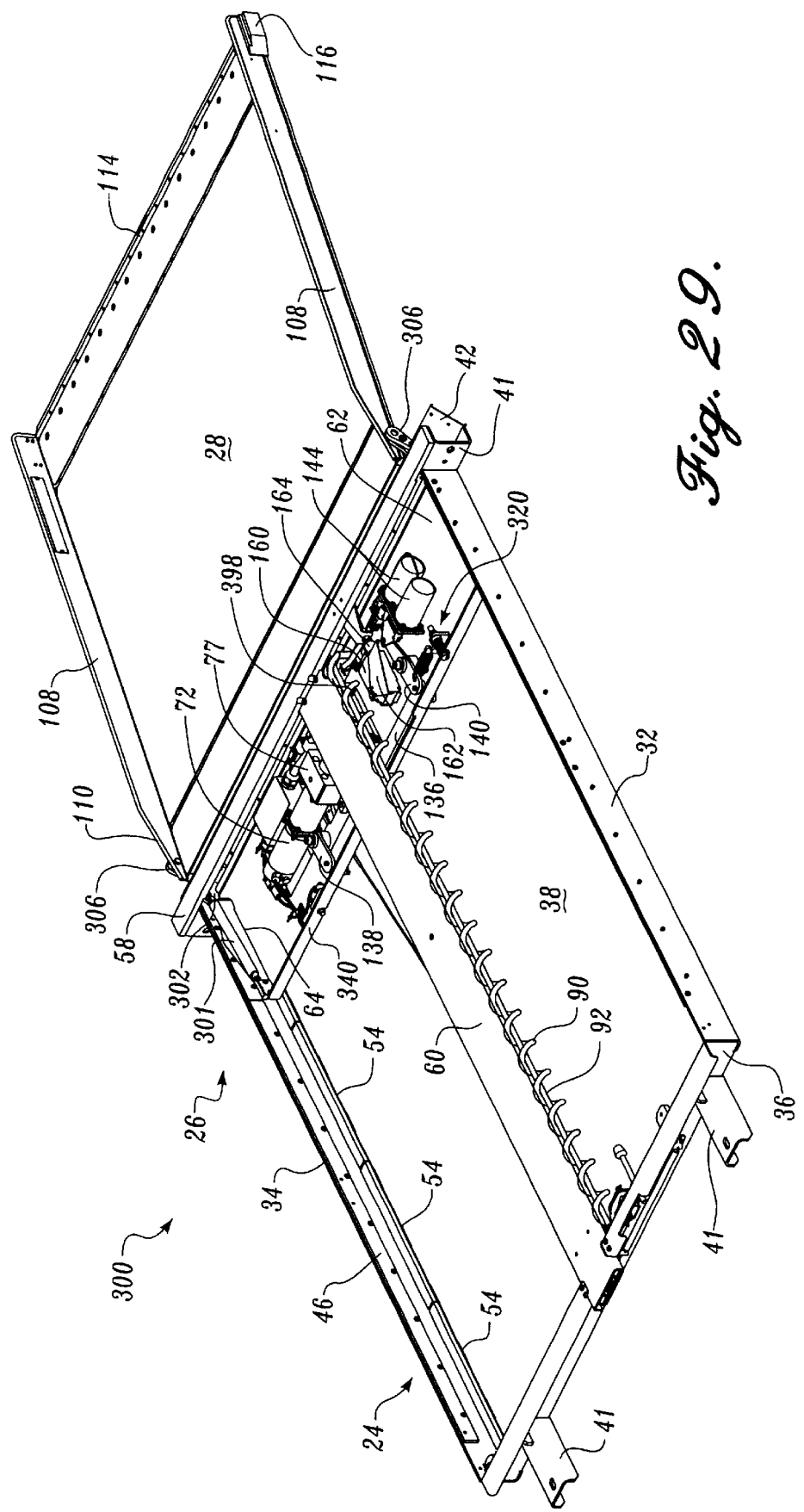
FIG. 29 is a rear, top perspective view of a second embodiment of a ramp assembly made in accordance with the present invention, with the ramp platform in the deployed position.

When the ramp platform is in the stowed position, the wire cable 184 extends through the V-notch 208 in the rear portion of the latch arm 122 (FIG. 25). If power is cut to the ramp assembly 20, the T-handle 194 can be pulled to operate the manual unlatching mechanism 180. When the T-handle 194 is pulled, the wire cable extends along the V-notch 208 until the wire rope ball shank 204 engages the rearward end of the latch arm 122, and causes the latch arm 122 (FIG. 26), as well as the second latch arm 124 (FIG. 28) to rotate. Rotation of the second latch arm 124 causes the cutout 134 to release from the stowed latch plate 156, and the ramp platform 28 is released. The ramp platform can then be manually withdrawn.

When the ramp platform 28 is fully deployed and power is cut to the ramp assembly 20, the manual unlatching mechanism 180 can be operated so as to release the ramp platform 28 so that it can be manually retracted. The rear end of the latch arm 122 includes a protrusion 210 (FIG. 20). This protrusion 210 is engaged by the camming surface 181 of the cam lever 182 when the ramp platform 28 is fully deployed and the T-handle 194 is pulled. Engagement of the protrusion 210 by the cam lever 182 causes the latch arm 122, as well as the latch arm 124, to rotate and release the deployed latch plates 146, 148 (FIGS. 21 and 23). In this manner, the manual unlatching mechanism 180 unlocks the ramp platform 28 and permits manual retraction of the ramp platform.

A disconnect coupling or clutch (not shown) can be coupled between the electrical motor 72 and drive shaft 74 to allow selective release of the drive pulley from the electrical motor 72, which would ease manual extension or retraction of the ramp mechanism. In addition, anti-friction bearings (not shown) at the shafts for the drive pulley 76 and idler pulleys 78 could reduce the force required to manually extend or retract the ramp platform 28. Finally, the drive belt 80 could be loosened or removed to reduce resistance to manual retraction or extension of the ramp platform 28.

The ramp assembly 20 of the present invention provides several advantages over prior art ramps. The lever arms 84 and pins 56 provide a mechanism by which the ramp platform 28 can be extended and the trailing end of the platform can be lifted, all in one translational movement. Thus, additional motors or mechanisms are not needed to lift the rear trailing end of the ramp platform 28. In addition, a transitional plate or other mechanism is not needed to provide a smooth transition between the ramp platform and the floor of the low-floor bus 22.

The present invention also provides the convenient reciprocating mechanism 26 that includes an electric motor 72 that is mounted for reciprocating motion with the ramp platform 28. This design saves space, and does not require a mounting structure for a motor underneath or behind the rectangular enclosure 24. The coiled electrical cable 90 permits accessible electrical power for the electric motor 72 and other components on the rectangular motor plate 62. Although the power supplied is disclosed as an electric motor 72, it is to be understood that hydraulic and other power sources could be used.

The ramp assembly 20 of the present invention also provides the manual unlatching mechanism 180, which permits manual release of the ramp platform 28 at the fully extended or retracted positions. The ramp platform 28 can then be manually extended or retracted.

FIGS. 29–51 show an alternate embodiment of a ramp assembly 300 embodying the present invention. As with the first described ramp assembly 20, the ramp assembly 300 includes a rectangular enclosure 24, a reciprocating mechanism 26, and a ramp platform 28. Like parts on the ramp assembly 20 and the ramp assembly 300 include like reference numerals.

The ramp assembly 300 includes springs 301 (best shown in FIGS. 30 and 32) that are attached to the lever arms 302. One of the springs 301 is attached at one end to an eyelet 303 at the upper extension of one of the lever arms 302. The opposite end of the spring 301 is attached to an eyelet 304 located at the rear inner edge of the adjacent bearing strip 64. A similar spring 301 is mounted on the opposite side of the rectangular motor plate 62 for attachment to the other lever arm 302.

The springs 301 are helpful in manual deployment of the ramp platform 28. It has been found that when the ramp platform 28 is manually deployed, the trailing end of the ramp platform very often does not lift upward high enough and therefore advance the rectangular motor plate 62 to engage the latch arms 122, 124 on the deployed latch plates 146, 148. The springs 301 overcome this problem by providing a lifting force that raises the trailing end of the ramp platform 28, and therefore aids in advancement of the rectangular motor plate 62, during manual extension.

Because the springs 301 cause the leading ends of the lever arms 302 to be biased upwards, the top edges 305 (FIGS. 32 and 33) of the lever arms 302 are shaped differently than the top edges of lever arms 84 for the first ramp assembly 20. Preferably, the top edges 305 slope slightly upward so that the top edges 305 can smoothly ride along and not be impeded by the pins 56. The slope of the top edges 305 causes the lever arms 302 to move along the pins 56, and permits a smooth, extension of the trailing end of the ramp platform 28, while guiding the curved slots 86 to the pins 56.

The springs 301 preferably have a sufficient spring constant and are sized so that they support approximately one-half the weight of the ramp of platform 28. The springs 301 therefore counterbalance the trailing edge of the ramp platform 28 upward, thus allowing a smooth transition for the curved slots 86 to engage the pins 56 which also allows advancement of the rectangular motor plate 62 a sufficient distance so that the deployed latch arms 122, 124 engage, roll over, and latch against the deployed latch plates 146, 148. By providing this function, the springs 301 enable an operator to manually extend the ramp platform 28 until the ramp platform is fully deployed without expending much extra effort as the trailing end of the ramp platform is raised.

The lever arm 302 includes a removable cam follower 306 (best shown in FIG. 33) attached at its leading end. The removable cam follower 306 serves the function of the circular bearing 88 of the previous embodiment, and additionally provides a convenient manner of removing the ramp platform 28.

Figure 41:
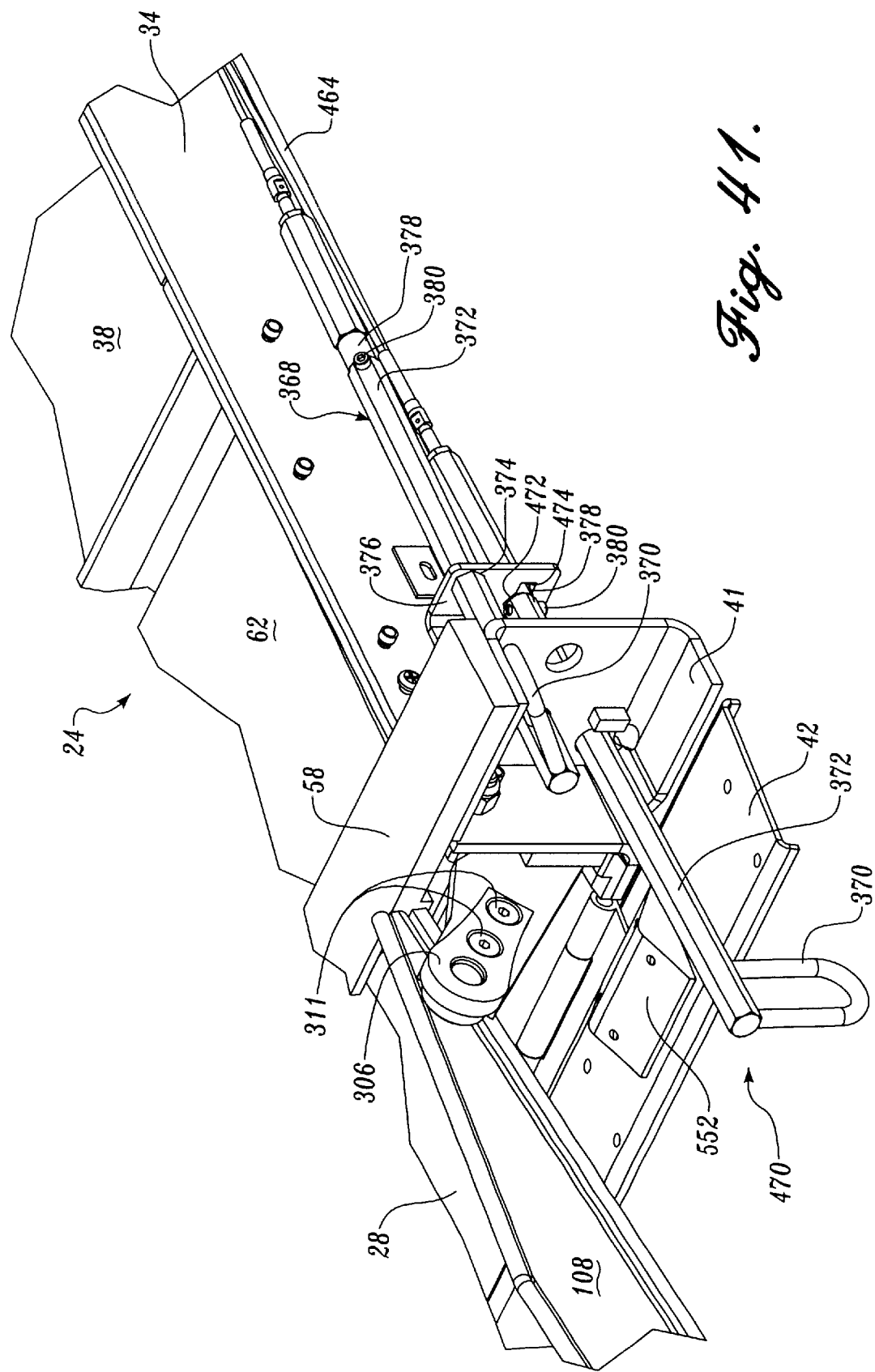
FIG. 41 is a detailed cutaway view of the handles for the belt release mechanism and manual unlatching mechanism of the ramp assembly in FIG. 29, with the handle for the belt release mechanism turned to a locked position.

The leading end of the lever arm 302 includes a half circular open end 307, the opening of which faces forward, and two threaded holes 308 spaced rearward therefrom. The removable cam follower 306 is teardrop shaped and includes a sleeve 309 extending off its rear surface at the larger portion of the tear drop shape. Two holes 310 are provided that match with the threaded holes 308 on the lever arm 302 and that are countersunk to receive the heads of cap bolts 311 (FIG. 41). A larger hole 312 that is concentric with the sleeve 309 is provided at the larger portion of the teardrop-shape of the removable cam follower 306. The larger hole 312 is aligned so that when the bolts 311 are extended through the small holes 310 and threaded into the threaded holes 308 on the lever arm 302, the larger hole 312 is concentric with the half circular open end 307 of the lever arm 302.

The larger hole 312 and sleeve 309 on the cam follower 306 are designed so that they fit over a pin 314 that extends sideways outward from the trailing end of the ramp platform 28. A similar pin 314 is located on the opposite side of the ramp platform 28 and is received within a similar removable cam follower 306 attached to the other lever arm 302. The lever arms 302 and removable cam followers 306 are spaced apart so that the pins 314 on opposite sides of the ramp platform 28 are received by and held against the cam followers 306 when the cam followers are tightened against the lever arms 302 by the cap bolts 311. The sleeve 309 is also seated against the half circular open end 307 of the lever arm 302.

The cap bolts 311 include a tool receiving pattern such as a hex socket head. By placing a tool into the tool receiving pattern and rotating the bolts 311, one of the removable cam followers 306 can be loosened and removed, releasing the respective pin 314 on that side of the ramp platform 28. The ramp platform 28 can then be lowered to move away from the lever arm 302, and then can be pulled so that the opposite pin 314 is pulled out of the hole 312 and sleeve 309 on the opposite removable cam follower 306. In this manner, the ramp platform 28 is removed from the ramp assembly 300 by disassembly of only one removable cam follower 306. This feature provides a simpler disconnect procedure for the ramp platform 28 if repair or maintenance needs to be performed.

The removable cam followers 306 are preferably formed from a low-friction bearing material. This material permits the removable cam followers 306 to freely slide between the support bearings 54 and guide bars 46.

It has been found that upon manual release by the manual unlatching mechanism 180 of the deployed latch arms 122, 128 from the deployed latch plates 146, 148, the weight of the ramp platform 28 pulls the lever arms 302 down a sufficient amount to retract the rectangular motor plate 62 into the rectangular enclosure 24 so that when the manual unlatching mechanism 180 is released, the deployed latch arms do not re-engage the deployed latch plates. To provide a similar function, a push-off spring mechanism 320 (best shown in FIG. 31) is provided on the rectangular motor plate 62 to initiate movement of the rectangular motor plate and the ramp platform 28 upon manual release in the stowed position. The push-off spring mechanism 320 initiates movement of the rectangular motor plate 62 upon manual release of the cutout 134 on the rearward end of the latch arm 124 from the stowed latch plate 156.

Figure 31:
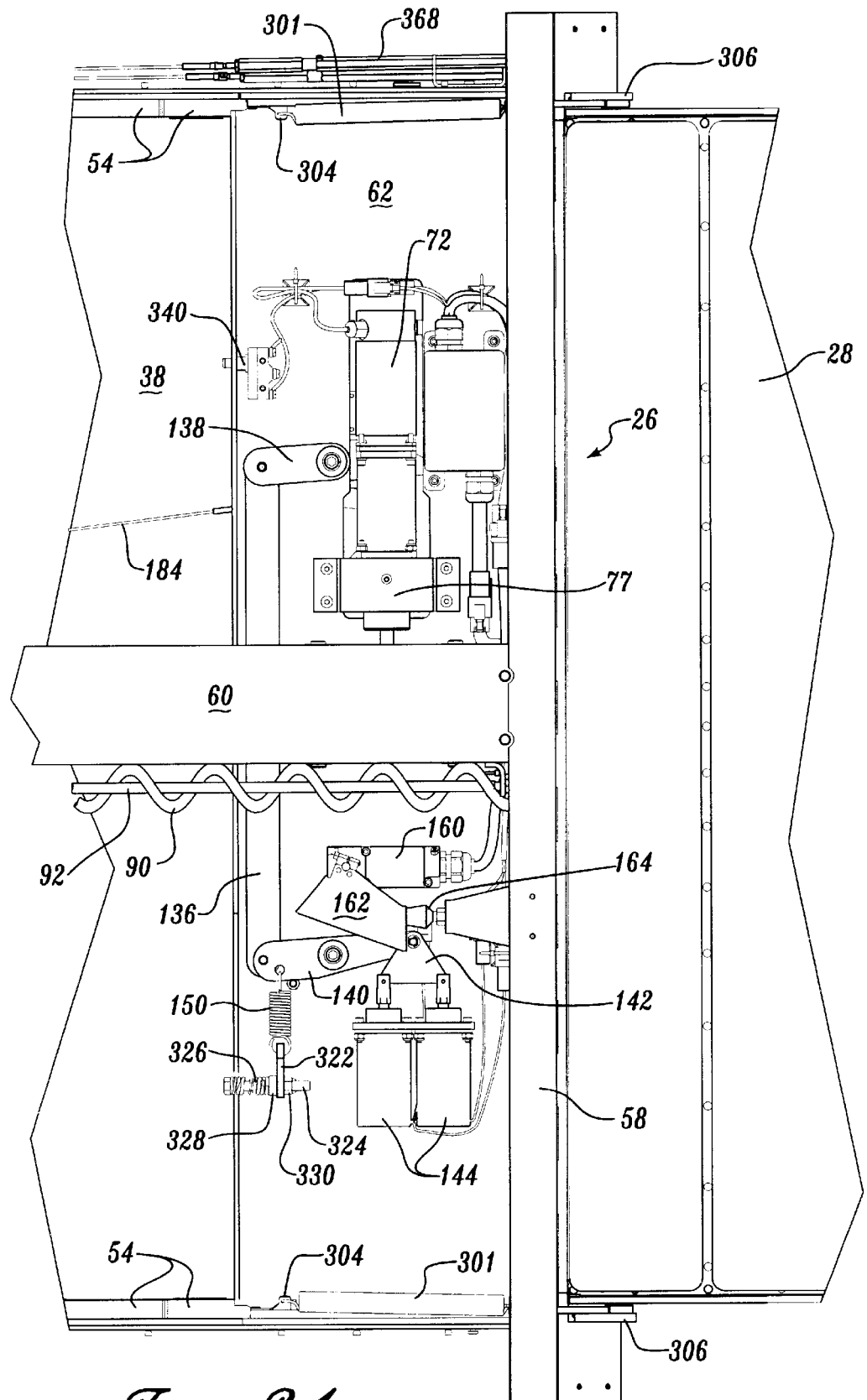
FIG. 31 is a top cutaway view of the rectangular motor plate for the ramp assembly in FIG. 29.
Figure 32:
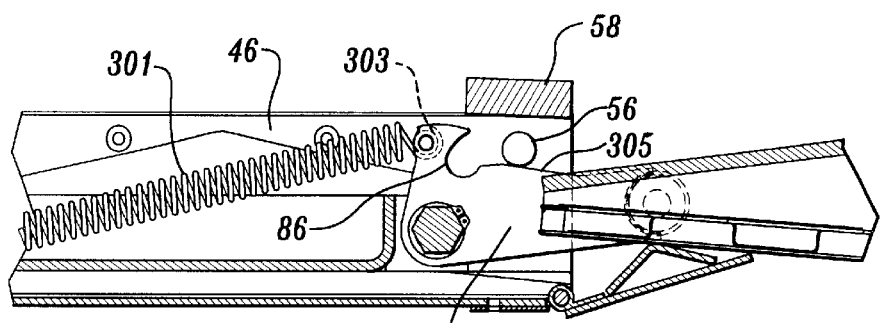
FIG. 32 is a side cutaway view of the lever arm of the ramp assembly in FIG. 29, with the ramp platform deployed a distance that is substantially the same as the deployment of the ramp platform in FIG. 15.
Figure 33:
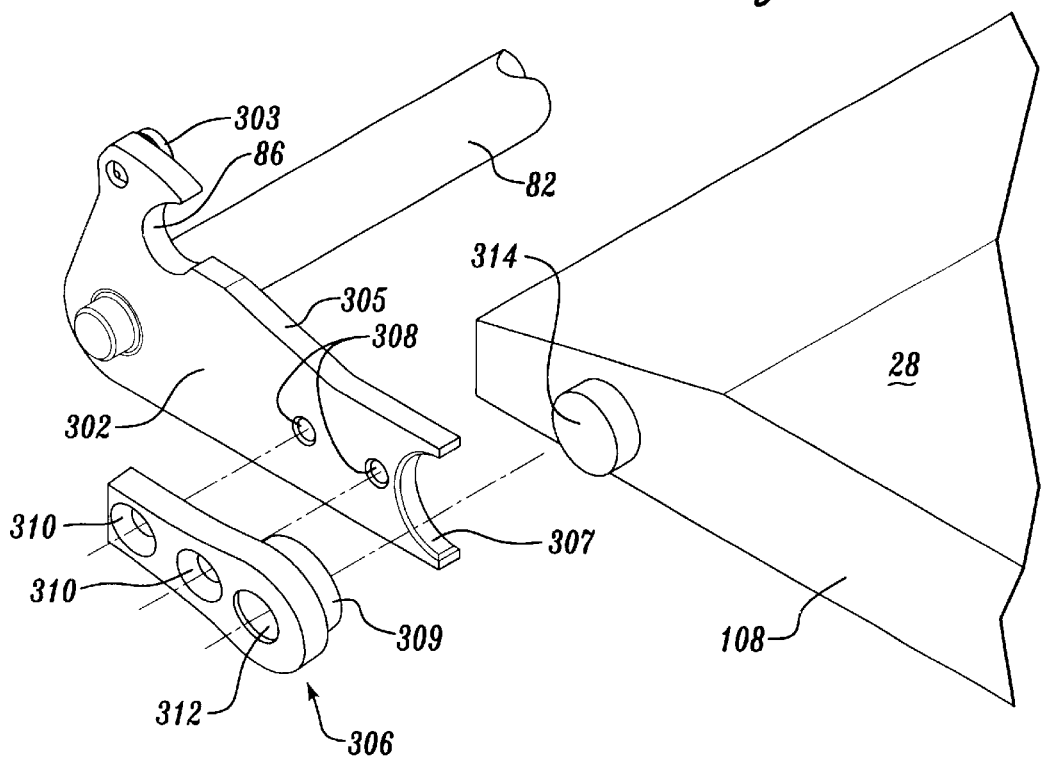
FIG. 33 is an exploded perspective view of the attachment of the lever arm in FIG. 32 to the ramp platform.
Figure 34:
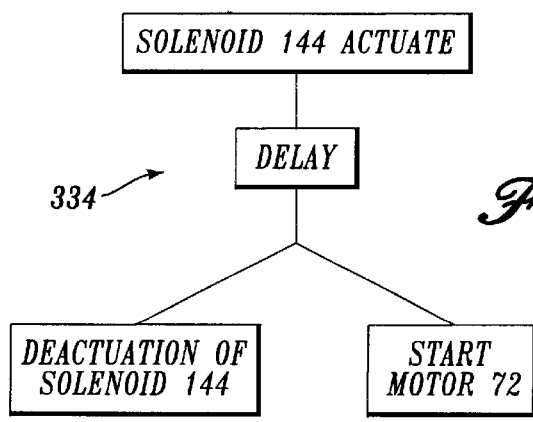
FIG. 34 is an operation diagram for a delay circuit for the solenoids and motor of the ramp assembly in FIG. 29.

As can be seen in FIG. 31, the push-off spring mechanism 320 includes a bracket 322 extending perpendicularly upward from the face of the rectangular motor plate 62. The bracket 322 includes a hole (not shown) extending parallel to the rectangular motor plate 62. A bolt 324 extends through a spring 326, into a spring retaining sleeve 328, and out through the hole. A nut 330 is threaded onto the end of the bolt that extends out of the hole. The opposite end of the bolt 324 is positioned so that it extends slightly rearward beyond the end of the rectangular motor plate 62. In operation, the head of the bolt 324 engages the end panel 36 of the rectangular enclosure 24. When the ramp platform 28 is in the stowed position, the spring 326 is slightly compressed. Actuation of the manual unlatching mechanism 180 causes the spring 326 to relax (extend) and push the rectangular motor plate 62 away from the end panel 36. This movement by the rectangular motor plate 62 away from the end panel 36 is sufficient to prevent the cutout 134 on the rearward end of the latch arm 124 from re-engaging the stowed latch plate 156 after manual release.

The ramp assembly 300 also incorporates a delay circuit 334 (FIG. 34) for more efficient operation of the solenoids 144 and the motor 72. Applicants have found that when power is supplied to the rectangular motor plate 62, the motor 72 begins movement of the rectangular motor plate 62 faster than the solenoids 144 release the latch mechanism 120. This lag in movement by the latch mechanism 120 is due largely to the weight of the latch mechanism 120. The motor 72 has a tendency to attempt to move the rectangular motor plate 62 immediately upon receiving power and before the latch arms 122, 124 have released from either the deployed latch plates 146, 148, or the stowed latch plate 156. To solve this problem, the present invention provides the delay circuit 334 shown in FIG. 34.

The delay circuit 334 introduces a time delay between actuation of the solenoids 144 and start of the motor 72. The delay circuit 334 utilizes delay circuitry (not shown, but well known in the art) to properly space the time between the start of the solenoids 144 and start of the motor 72, so that the latch arms 122, 124 are fully released before the motor 72 attempts to move the rectangular motor plate 62.

Applicants have also found it to be advantageous to use similar timing circuitry within the delay circuit 334 to deactuate the solenoids 144 simultaneously with start of the motor 72. Because start of the motor 72 occurs more rapidly than deactuation of the solenoids 144 can cause return of the latch mechanism 120 by the spring 150 and the return stroke of the solenoids 144, the motor moves the rectangular motor plate 62 before the latch arms 122, 124 can re-engage the latch plates. In addition, by deactuating the solenoids 144 at the same time the motor 72 is started, the solenoids and the motor are not powered at the same time. This results in less power having to be provided to the rectangular motor plate 62.

A sensor switch 340 (FIG. 31) is provided on the trailing end of the rectangular motor plate 62. The sensor switch 340 engages the end panel 36 when the rectangular motor plate 62 is in the stowed position. The sensor switch 340 provides an interlock signal to the low floor bus 22 upon engagement of the sensor switch 340 with the end panel 36. The interlock signal is an indication that the ramp platform 28 is in the stowed position. The interlock signal can be wired to an interlock in the bus electrical system so as to prevent travel of the bus when the ramp platform 28 is not in the stowed position. Alternatively, the interlock signal can light an indicator lamp at the control panel for the bus driver, or other indicators could be provided.

Figure 35:
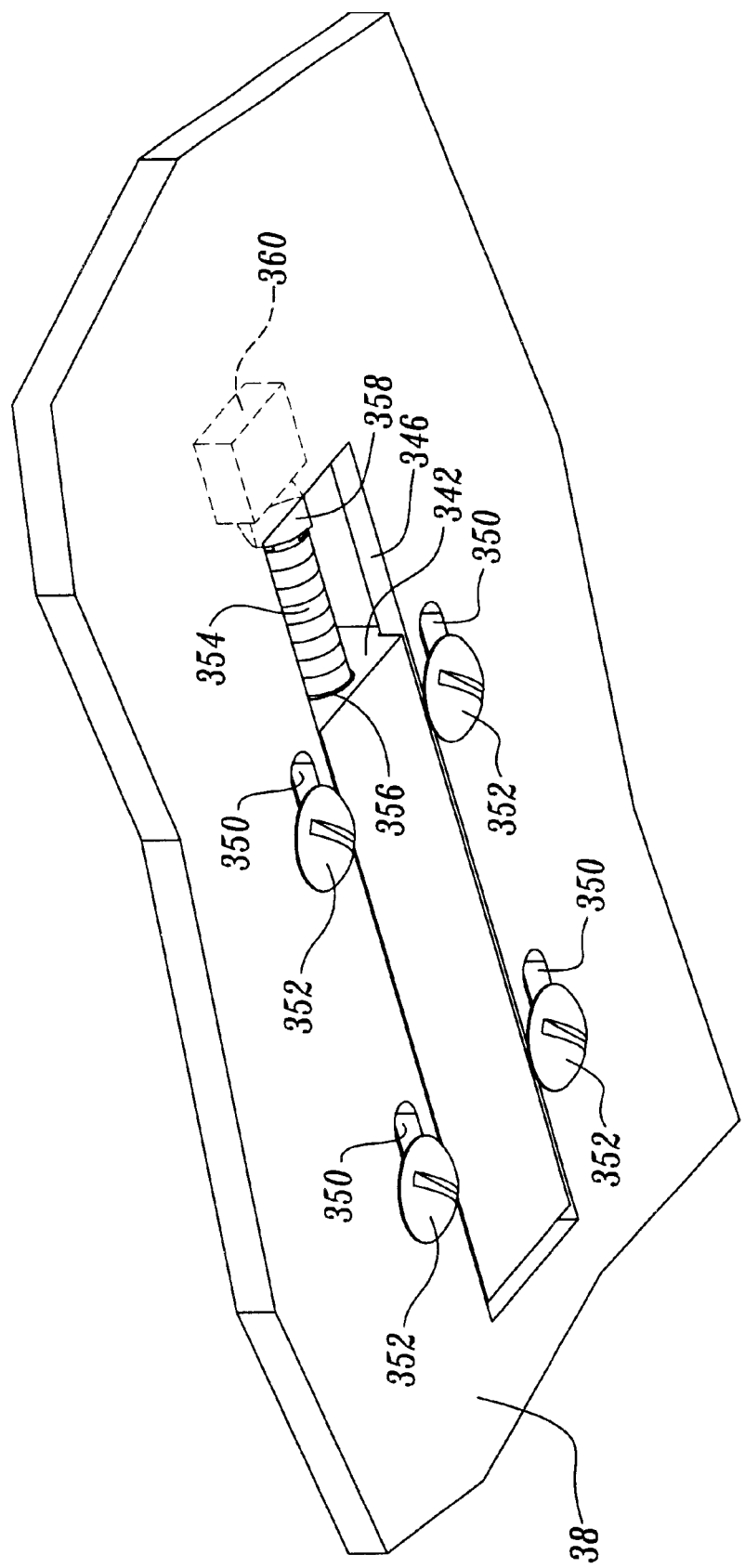
FIG. 35 is a bottom cutaway view of an adjustable deployed latch plate for the ramp assembly in FIG. 29.
Figure 36:
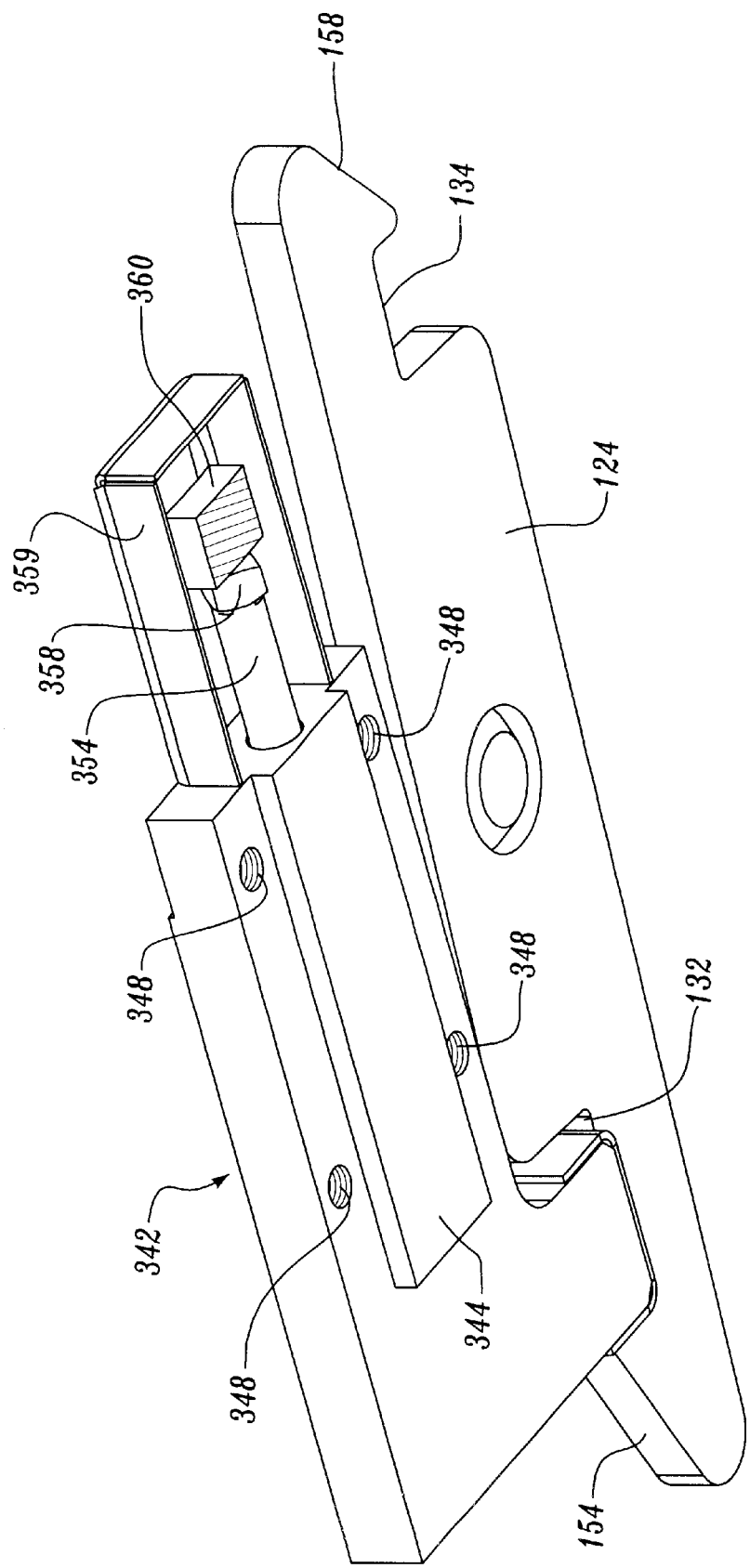
FIG. 36 is a bottom view of the adjustable deployed latch plate in FIG. 35, with the bottom plate removed, and a latch arm shown in position against the latch plate.
Figure 51:
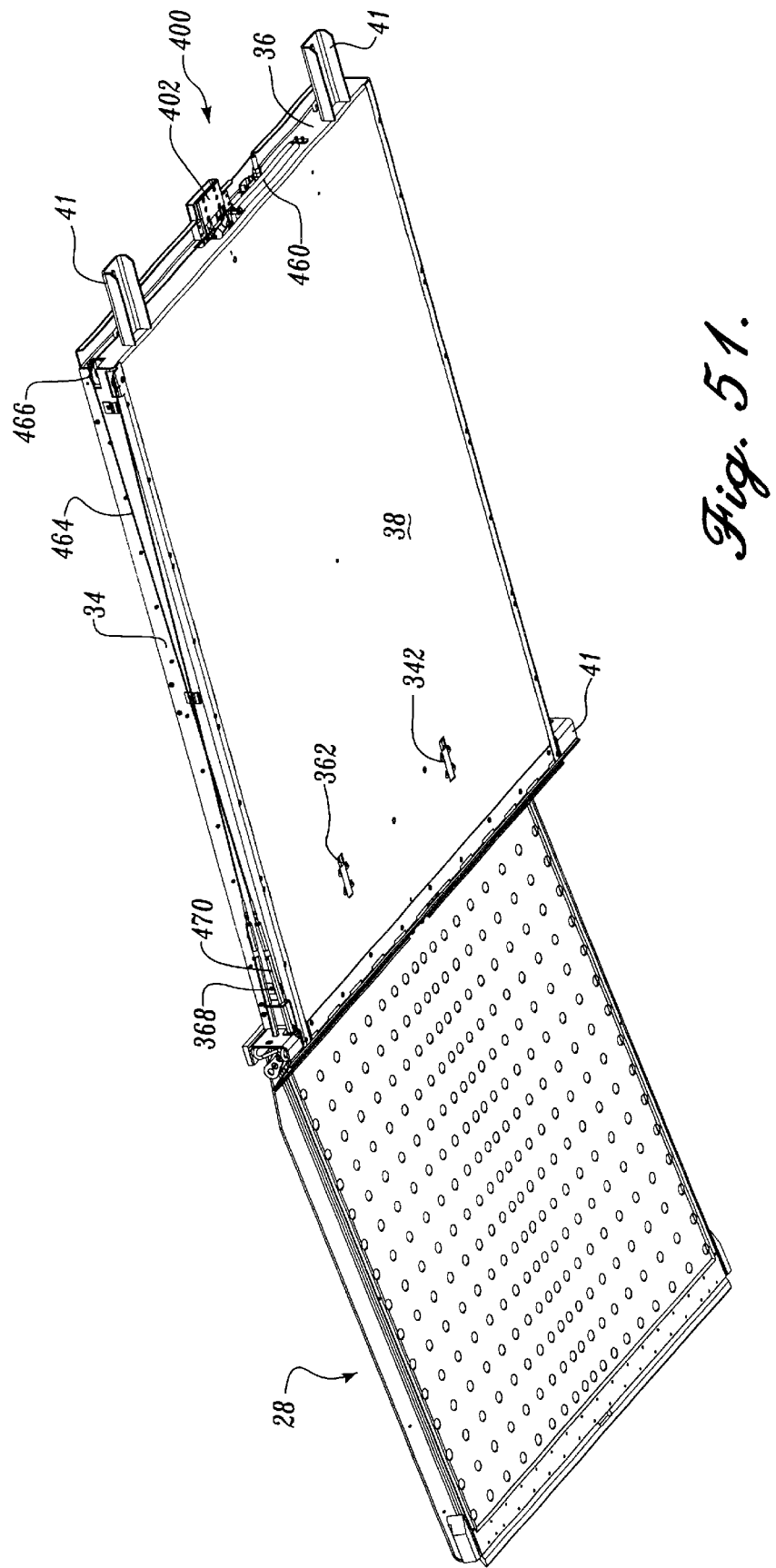
FIG. 51 is a rear, bottom perspective view of the ramp assembly in FIG. 29.

The ramp assembly 300 includes an adjustable deployed latch plate 342 (shown in relation to the ramp assembly in FIG. 51). The underside of the adjustable deployed latch plate 342 is shown in FIG. 36. The adjustable deployed latch plate 342 includes a rectangular raised section 344 that extends along the bottom side of the deployed latch plate. The rectangular raised section 344 is configured to fit within a rectangular elongate cutout 346 in the bottom panel 38 (FIG. 35). The rectangular elongate cutout 346 is longer than the rectangular raised section 344, but only slightly larger in width, which permits the adjustable deployed latch plate 342 to fit within and slide along the rectangular elongate cutout. The adjustable deployed latch plate 342 includes a number of threaded holes 348 (FIG. 36) extending into the bottom of the latch plate and located on opposite sides of the rectangular raised section 344. The threaded holes 348 align with elongate slots 350 on the bottom panel 38 (FIG. 35). Screws 352 extend through the elongate slots 350 into the threaded holes 348.

A rod 354 is threaded into a female threaded hole 356 that extends into the aft section of the adjustable deployed latch plate 342. The threaded rod 354 includes a tool receiving pattern 358, such as the head of a bolt, at its distal end. A five-sided box 359 is attached to the aft end of the adjustable deployed latch plate 342, over the end of the threaded rod 354. The five-sided box 359 keeps dirt and other road grime from entering the ramp assembly 300 through the rectangular elongate cutout 346.

An abutment surface in the form of a metal protrusion 360 is located on the top surface of the bottom panel 38 just rearward of the end of the rectangular elongate cutout 346. The metal protrusion 360 can be formed integral with the bottom panel 38, punched out of the bottom panel, welded integral with the bottom panel, or can be formed in other conventional methods.

In practice, the adjustable deployed latch plate 342 is arranged so that the rectangular raised section 344 extends into the rectangular elongate cutout 346. The screws 352 extend through the elongate slots 350 and into the threaded holes 348. The screws 352 are not tightened until the adjustable deployed latch plate 342 is properly aligned relative to the latch arm 124. To properly align the adjustable deployed latch plate 342, the rectangular raised section 344 is slid along the rectangular elongate cutout 346 until the adjustable deployed latch plate 342 is approximately aligned with the cutout 132 on the latch arm 124 when the rectangular motor plate 62 and the ramp platform 28 are in the fully deployed position. A tool (not shown) that fits on the tool receiving pattern 358 rotates the threaded rod 354 until the threaded rod abuts against the metal protrusion 360. Further rotation of the threaded rod 354 moves the adjustable deployed latch plate 342 toward the front of the rectangular elongate cutout 346. By maintaining the threaded rod 354 snugly against the metal protrusion 360, rotation of the threaded rod provides minute adjustments of the adjustable deployed latch plate 342. In this manner, the adjustable deployed latch plate 342 can be aligned so that latch arm 124 fits precisely over the latch plate when the ramp platform is in the fully deployed position.

Preferably, a second adjustable deployed latch plate 362 (FIG. 51) is provided for alignment with the cutout 130 of the other latch arm 122. The details of the second adjustable deployed latch plate are not shown, but could be similar to the adjustable deployed latch plate 342 described. The adjustable deployed latch plates 342, 362 provide a method for properly aligning the latch plates with the latch arms 122, 124 that is accessible from the bottom (outside) of the rectangular enclosure 24.

A manual unlatching mechanism 366 is provided for the ramp assembly 300 that is substantially the same as the manual unlatching mechanism 180 described with reference to the ramp assembly 20. However, a different handle 368 (best shown in FIG. 41) is utilized in the manual unlatching mechanism 366. The handle 368 includes a loop 370 at a forward end that is attached to a hexagonal rod 372. The hexagonal rod 372 extends through a hexagonal slot 374 in a bracket 376 that extends perpendicular from the side panel 34 of the rectangular enclosure 24. The hexagonal rod 372 includes a rounded circumferential groove 378 spaced from the distal end of the hexagonal rod. Just forward of the rounded groove 378, a cap bolt 380 extends radially into the hexagonal rod 372. The head of the cap bolt 380 extends out of the side of the hexagonal rod 372.

The front end of the handle 368 extends through a hole (not shown) in the bracket 41. The loop 370 is normally positioned between the bracket 41 and the hinged closure panel 42.

A release tool 382 (FIG. 50) is used to unlatch the manual unlatching mechanism 366. The release tool includes a handle 384, a hook 386, and a round tube (or rod) 388 extending from the handle to the hook. The hook 386 is sized so that it can fit within the loop 370 of the handle 368, and can extend over one side of the loop.

In practice, the release tool 382 is gripped at the handle 384 by an operator, and the hook 386 is extended into the loop 370 of the handle 368 of the manual unlatching mechanism 366. The operator may have to open the hinged closure panel 42 to access the handle 368. The operator pulls outward on the release tool 382, which pulls outward the handle 368. The handle 368 is attached to the wire cable 184, and pulling outward on the handle rotates the latch arms 122, 124 as was described with reference to the first ramp assembly 20.

The hexagonal shapes of the hexagonal rod 372 and the hexagonal slot 374 prevent rotation of the hexagonal rod and maintains the loop 370 in alignment so that it can extend out of and retract into the frame 41. The hexagonal rod 372 is pulled outward until the cap bolt 380 abuts against the bracket 376. The contact of the cap bolt 380 with the bracket 376 precludes further extension of the hexagonal rod 372.

During extension of the handle 368, the manual unlatching mechanism 366 releases the latch arms 122, 124 from the deployed latch plates 342, 362 or the stowed latch plate 156. After the latch arms 122, 124 are released, the operator can stop pulling on the handle 368, and the spring 186 returns the handle 368 into position against the bracket 41. Although actuation of the manual unlatching mechanism 366 is described with reference to use of a release tool 382 by an operator, it is to be understood that the handle 368 of the manual unlatching mechanism 366 could be gripped by the fingers of an operator, or could be pulled outward using other methods.

Figure 38:
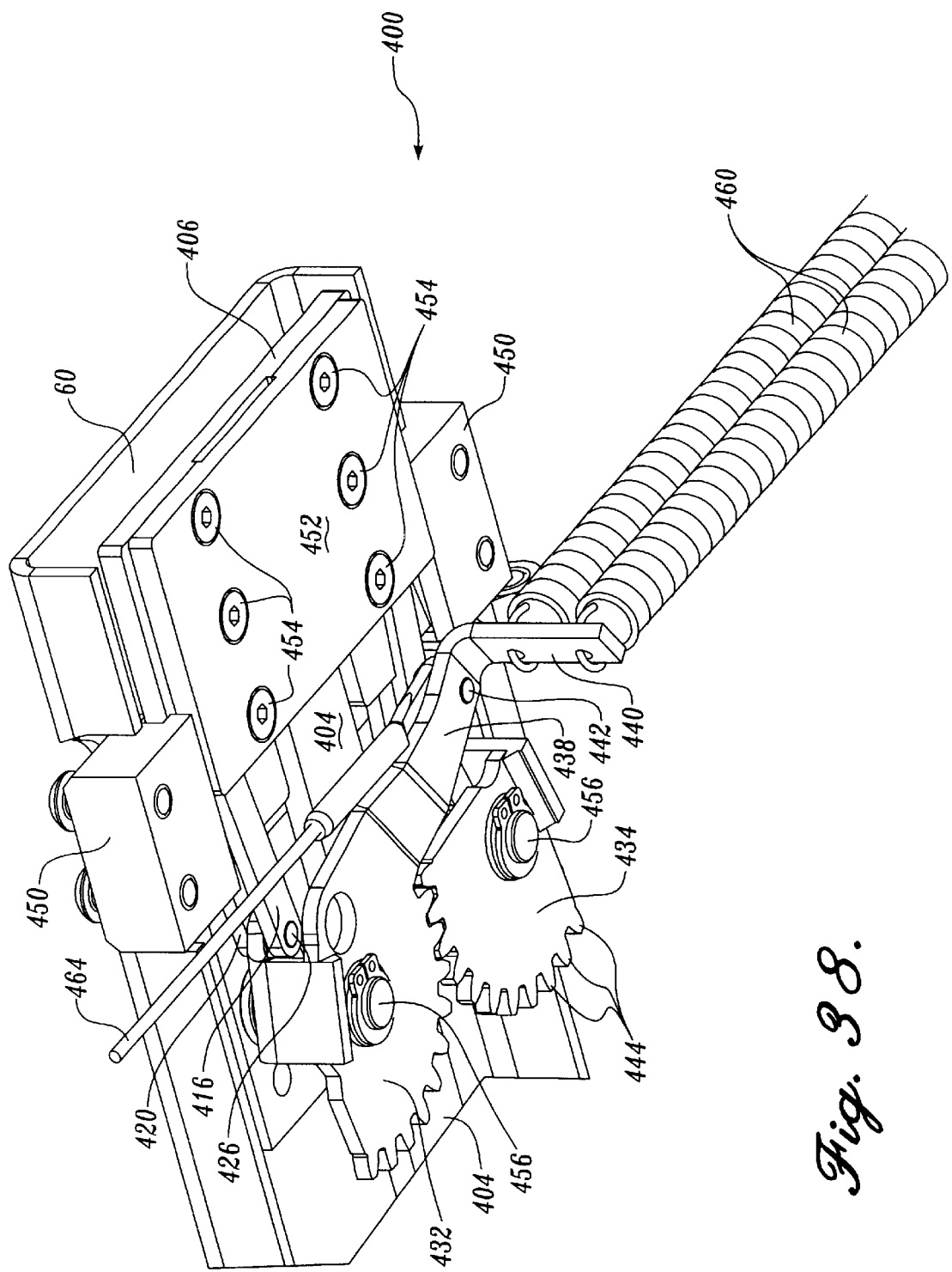
FIG. 38 is the belt release mechanism in FIG. 37, with the rectangular enclosure for the ramp assembly removed for detail.

The ramp assembly 300 incorporates a drive belt clutch mechanism 398 (FIG. 44) and a manual belt release mechanism 400 (FIG. 38). In summary, the two mechanisms 398, 400 work together so that a belt release assembly 402 of the manual belt release mechanism 400 relaxes the drive belt 404 (i.e., removes tension), and the drive belt clutch mechanism 398 separates the drive belt 404 from operation of the motor 72. In this manner, the ramp platform 28 can be manually extended and retracted without the resistance of the motor 72 against the drive belt 404. The manual belt release mechanism 400 will be described below, followed by a description of the drive belt clutch mechanism 398.

The manual belt release mechanism 400 includes a belt release assembly 402 (FIG. 39) that is attached to the drive belt 404. The belt release assembly 402 includes a toothed belt clamp 406. The toothed belt clamp 406 is a flat plate with a series of slots 408 extending from front to back along its center and a cutout 410 just forward of the slots. Threaded holes 412 are aligned along both sides of the slots 408. At the front, top end of the toothed belt clamp 406 are two triangular cutout recesses 414.

A separate belt tensioner link 416 (FIG. 39) is pivotally mounted from the apex of each of the triangular cutout recesses 414. Pins 418 extend through each of the belt tensioner links 416, through the toothed belt clamp 406 at the apex of the triangular cutout recesses 414, and into an additional set of belt tensioner links 420 on the opposite side of the toothed belt clamp 406. Thus, each pin 418 acts as a pivotal mount for both a belt tensioner link 416 located on the top of the toothed belt clamp 406 and located within the triangular cutout recesses 414, and a belt tensioner link 420 located underneath the toothed belt clamp 406. The belt tensioner links 416, 420 extend forward to opposite sides of eccentric pivot mounts 422, 424 (best shown in FIG. 43). The eccentric pivot mounts 422, 424 each have a flanged bearing 428 extending therethrough. L-brackets 430, 431 extend upward from the eccentric pivot mounts 422, 424.

Figure 30:
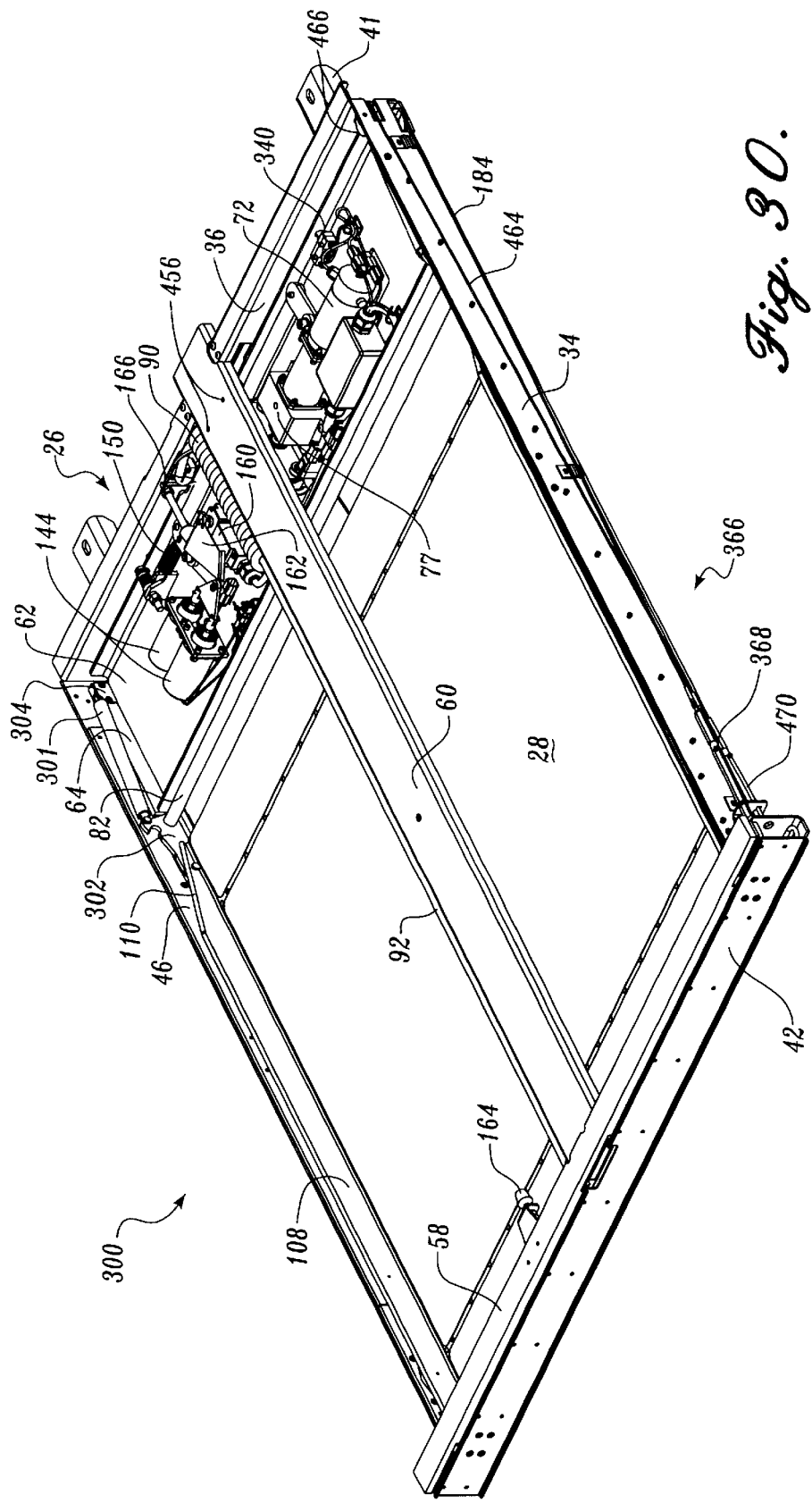
FIG. 30 is a front, top perspective view of the ramp assembly in FIG. 29, with the ramp platform in the stowed position.
Figure 42:
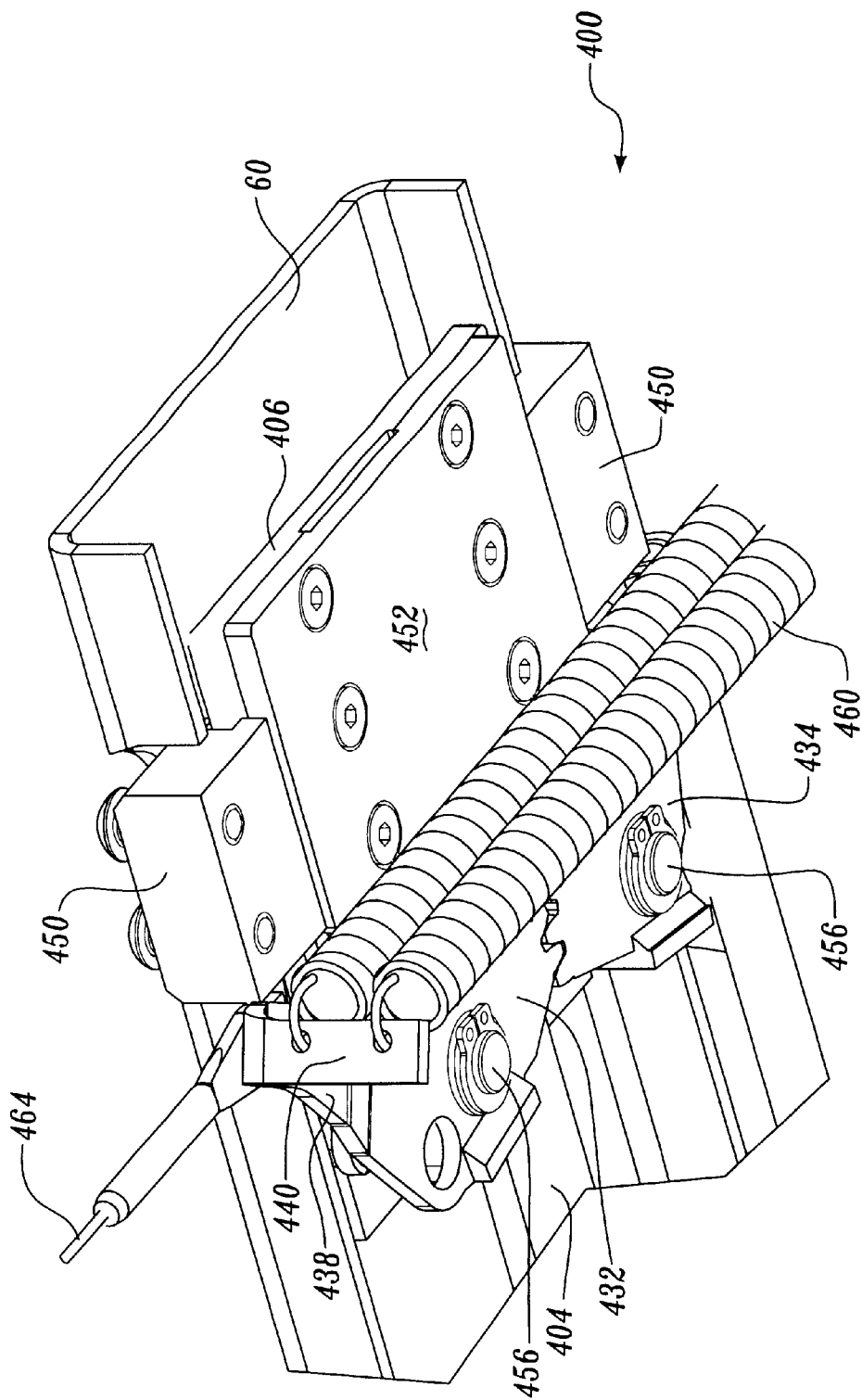
FIG. 42 is the belt release mechanism in FIG. 38, with the belt released.
Figure 43:
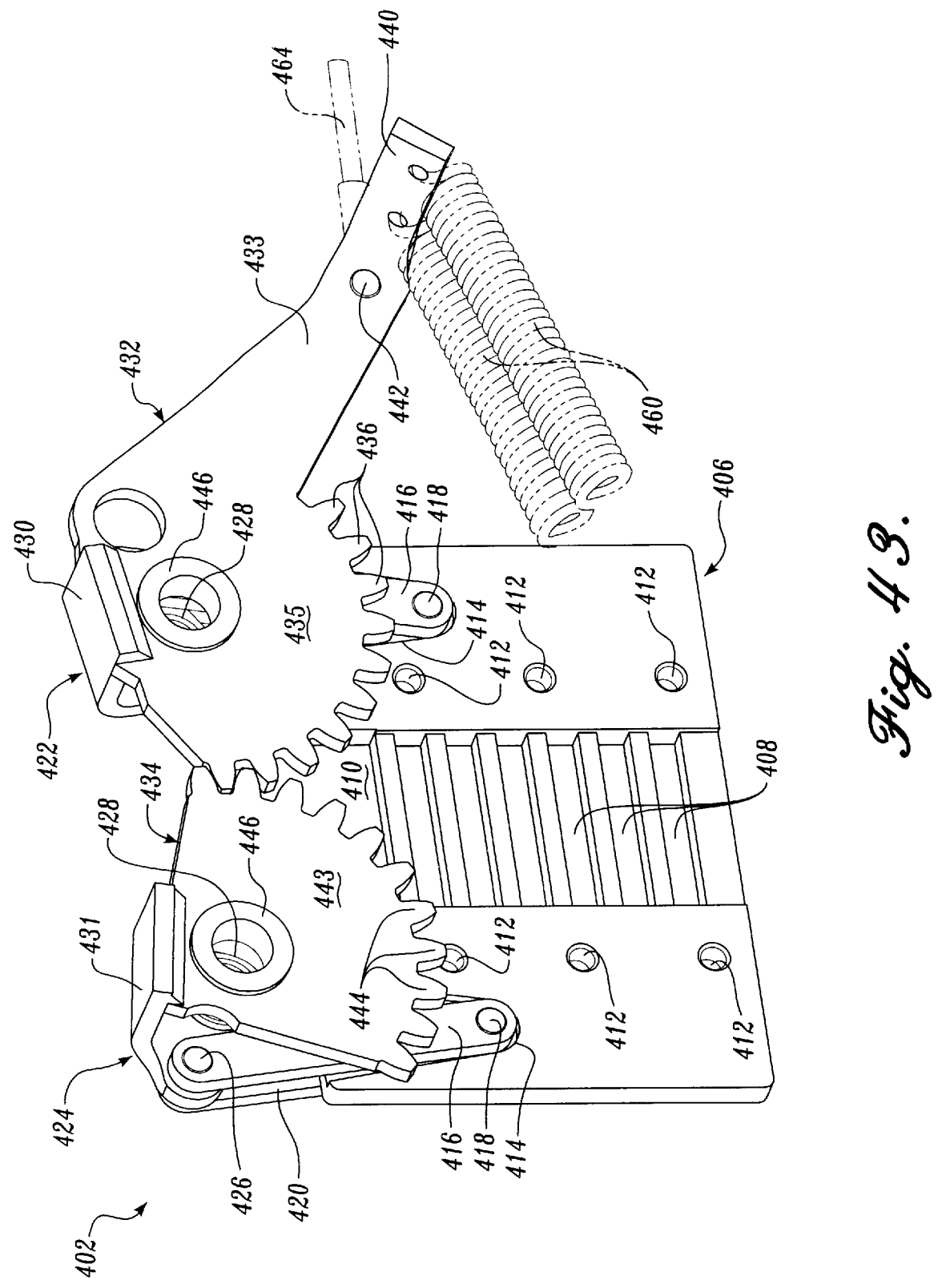

The eccentric pivot mounts 422, 424 are rotatably mounted on pins 456 that extend into the structured channel 60. The tops of the pins 456 are shown in FIG. 30, and the bottoms of the pins are shown in FIG. 42. The belt tension links 416, 420 are pivotally mounted about pins 426 (one shown in FIG. 43, one shown in FIG. 38) that are eccentrically mounted about the pin 456 on the eccentric pivot mounts 422, 424.

A drive cam 432 (FIG. 39) is attached to the L-bracket 430 of the eccentric pivot mount 422, and a driven cam 434 is attached to the L-bracket 431 of the opposite eccentric pivot mount 424. The drive cam 432 includes a half circular plate 435 having teeth 436 along an outer edge of the circumference of the half circle, and a lever arm 438 fixed at one end of the circumference of the half circle. The lever arm 438 extends outward in a plane from the plate 435 and bends at a distal end at a right angle to form a spring attachment 440. A pin 442 is located adjacent to the angle formed between the spring attachment 440 and the lever arm 438.

The driven cam 434 includes a quarter circle plate 443 having teeth 444 along an outer edge of the circumference of the quarter circle, and arranged to engage the teeth 436 on the drive cam 432. The drive cam 432 and the driven cam 434 both include flanged bearings 446 aligned with the flanged bearings 428 in the eccentric pivot mounts 422, 424. The pins 456 extend into the pairs of flanged bearings 446, 428.

Figure 37:
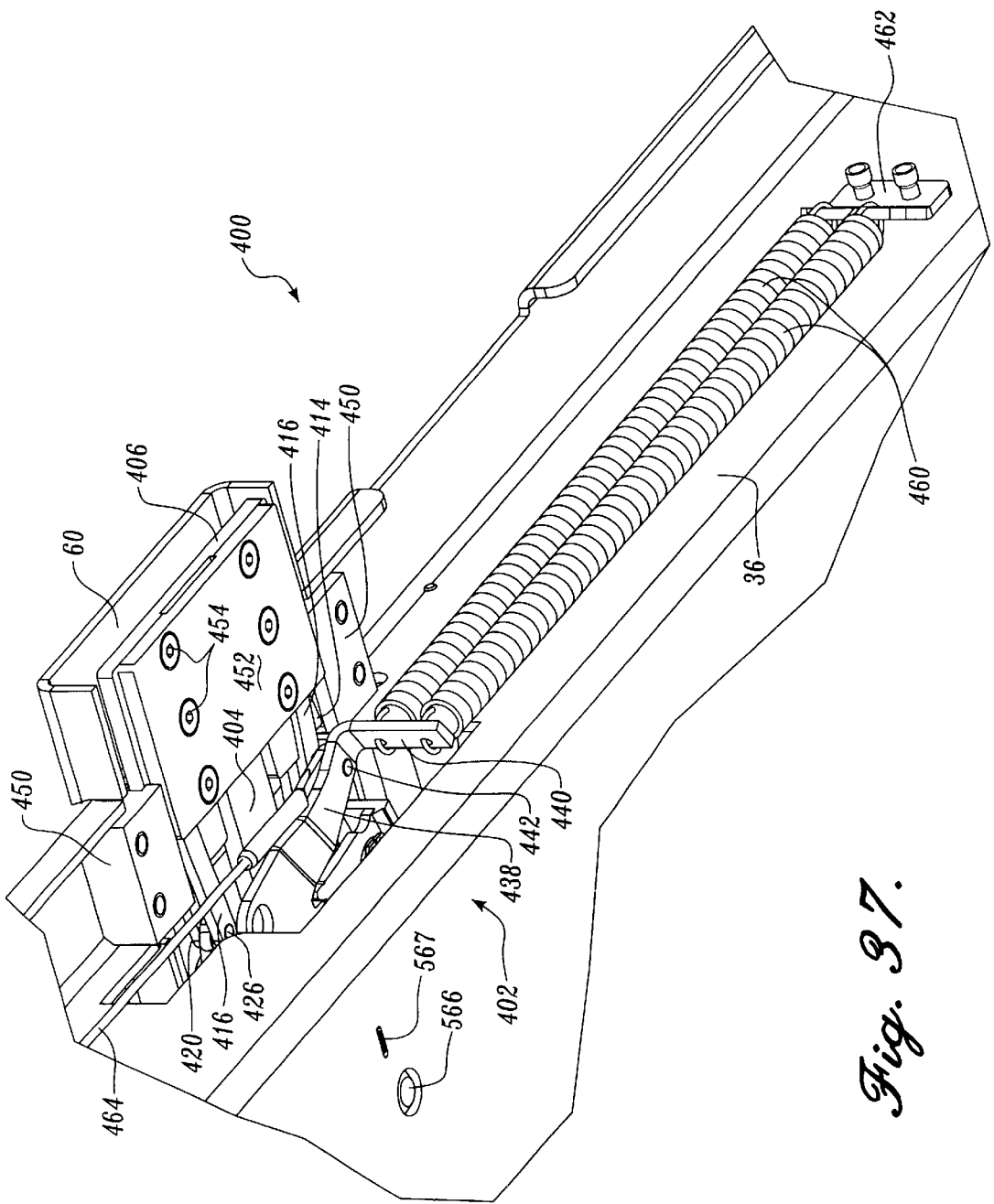
FIG. 37 is a rear, underside view of a belt release mechanism for the ramp assembly in FIG. 29.

Turning now to FIG. 37, the belt release assembly 402 is mounted just below the structural channel 60 at the rearward portion of the rectangular enclosure 24 (location relative to the entire ramp assembly 300 is shown in FIG. 51). A pair of grooved bearings 450 are mounted on opposite sides of the structural channel 60 to slidingly receive the side edges of the toothed belt clamp 406. Teeth on the drive belt 404 extend between the slots 408 on the toothed belt clamp 406. A drive belt clamp plate 452 is attached over the drive belt 404 and the toothed belt clamp 406 so as to capture the drive belt 404. The drive belt clamp plate 452 is held in position against the toothed belt clamp by a series of fasteners 454 that extend through holes (not shown) in the drive belt clamp plate 452 and into the threaded holes 412 in the toothed belt clamp 406.

Referring now to FIG. 38, the pins 456 extend through the top of the structural channel 60 and downward through the flanged bearings 446, 428, on the eccentric pivot mounts 422, 424 and the drive cam 432 and driven cam 434. The drive cam 432 and driven cam 434 are thus mounted for rotation with the eccentric pivot mounts 422, 424 about the pins 456.

A pair of springs 460 (full mounting shown in FIG. 37) are each attached at one end to a bracket 462 on the back side of the end panel 36, and attached at the other end to the spring attachment 440 on the lever arm 438 of the drive cam 432. A belt release cable 464 is attached at the pin 442 on the lever arm 438 of the drive cam 432. The belt release cable 464 extends from the pin 442 along the back of the end panel 36 (FIG. 51) through a pulley 466 and forward to a handle 470 mounted just below the handle 368 for the manual unlatching mechanism 366. The handle 470 includes a similar structure to the handle 368, including a loop 370, hexagonal rod 372, rounded groove 378, and cap bolt 380. The handle 470 for the manual belt release mechanism 400 extends through a hexagonal slot 472 in the bracket 376 that includes a cutout 474. The cutout 474 is arranged opposite the side panel 34 and extends radially outward from the circumference of the hexagonal slot 472. The cutout 474 is slightly larger than the head of the cap bolt 380, the function of which will be described in detail below. The handle 470, like the handle 368, is accessible between the bracket 41 and the hinged closure panel 42 (FIG. 41).

Figure 40:
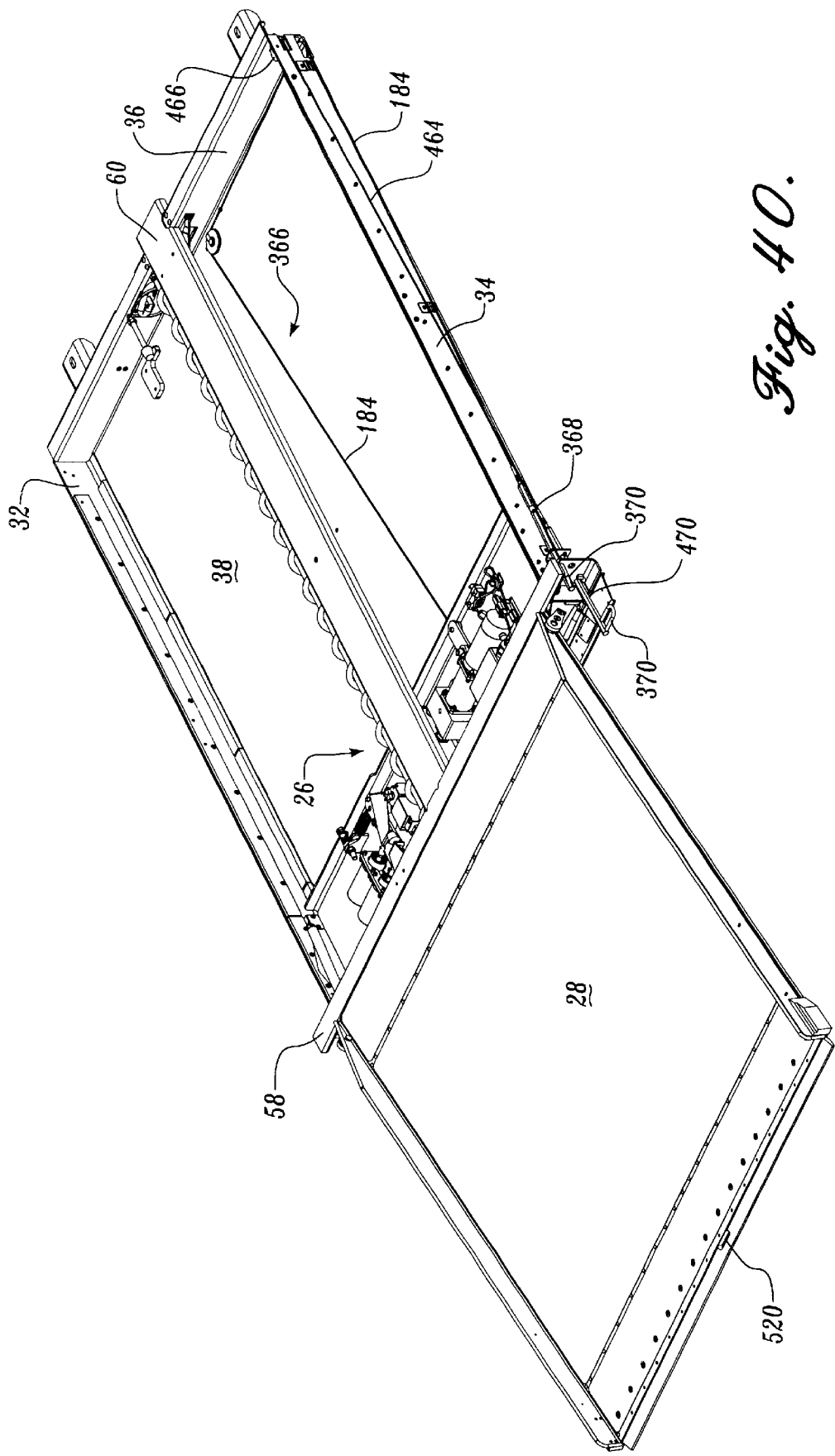
FIG. 40 is a front, top perspective view of the ramp assembly in FIG. 29, with the belt release mechanism released so that the tension in the belt is removed.

The operation of the manual belt release mechanism 400 will now be described. If manual retraction or deployment of the ramp platform 28 is desired, the manual belt release mechanism 400 is actuated so as to release the drive belt 404. To do this, the hinged closure panel 42 is manually opened and the loop 370 of the handle 470 is grasped by the hook 386 of the release tool 382. The operator pulls on the release tool 382, causing the handle 470 to extend outward from the bracket 41 (FIG. 40). Pulling the handle 470 outward in this manner causes the head of the cap bolt 380 to be pulled through the cutout 474. The rounded groove 378 is aligned with the hexagonal slot 472, which permits the handle 470 to be rotated 90 degrees to extend downward (FIG. 41) so that the head of the cap bolt 380 is no longer aligned with the cutout 474. In this position, the handle 470 cannot retract, because the contact between the head of the cap bolt 380 and the bracket 376 prevents movement of the handle rearward. The handle 470 is positioned so that it holds the hinged closure panel 42 open, allowing the operator access to the handle 368 for the manual unlatching mechanism 366.

Pulling outward on the handle 470 causes the belt release assembly 402 to release tension on the drive belt 404. In normal, tensioned mode of the drive belt 404, the belt release assembly 402 is in the position shown in FIG. 39. In this arrangement, the belt tension links 420, 416 are in an over-center eccentric position. That is, the tension in the drive belt 404 and the eccentric mounting of the belt tension links 416, 420 on the eccentric pivot mounts 422, 424 biases the drive cam 432 and the driven cam 434 into the positions shown in FIG. 39, and in a direction opposite of the arrows shown on the surfaces of the drive cam and driven cam. The springs 460 also pull the lever arm 438 and therefore the drive cam 432 in a direction that is opposite the arrows.

Figure 39:
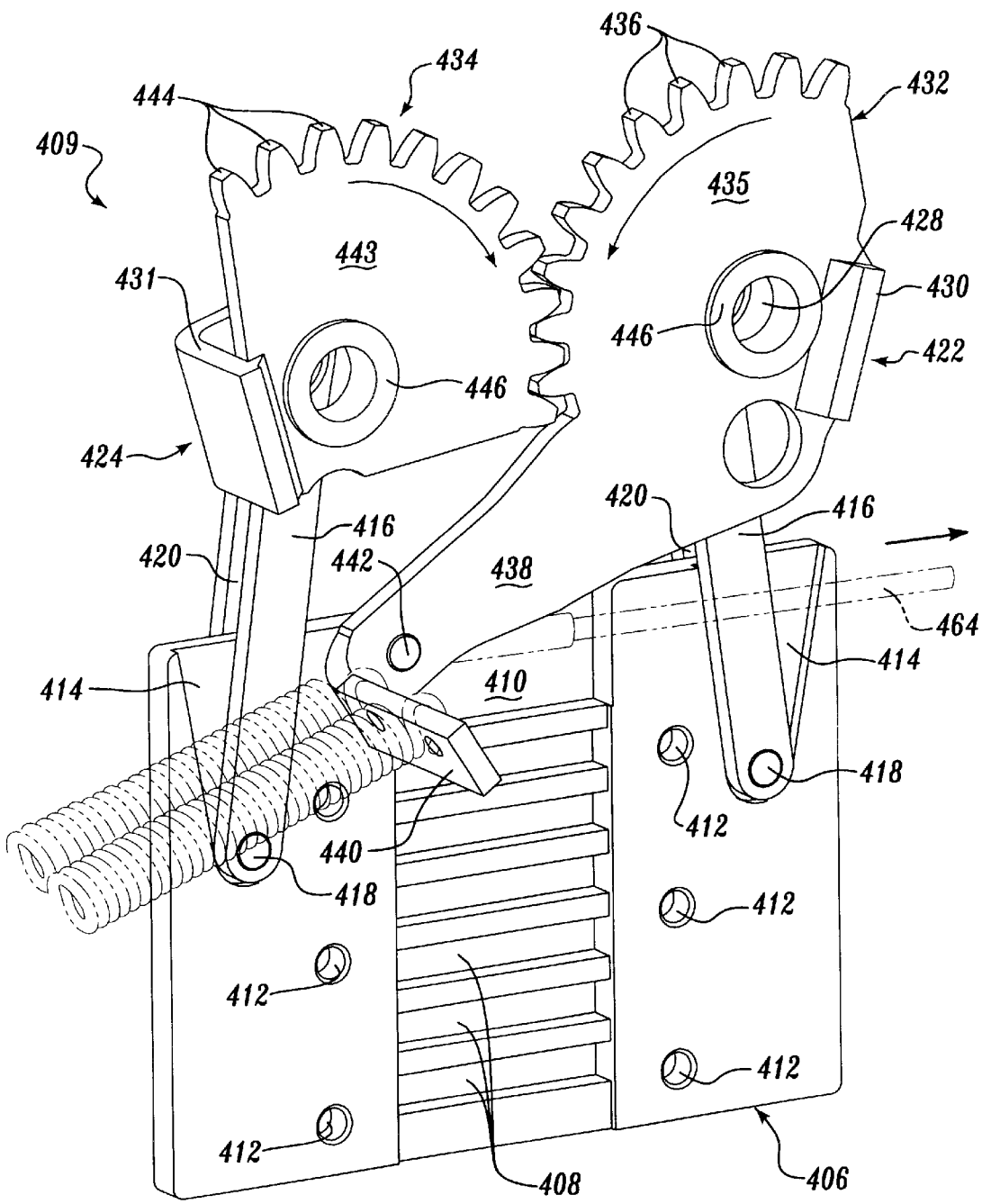
FIG. 39 is a side perspective view of the belt release assembly for the belt release mechanism in FIG. 38.

By pulling on the handle 470, the belt release cable 464 pulls the lever arm 438 so that the drive cam 432 and driven cam 434 are rotated in the direction of the arrows in FIG. 39. At the beginning of this rotation, the belt tension links 416, 420 resist movement because of the over-center location of the belt tension links relative to their eccentric mounting on the eccentric pivot mounts 422, 424. Once this initial resistance is overcome, the pins 426 at the upper end of the belt tension links 416, 420 are rotated by and about the eccentric pivot mounts 422, 424 to the opposite side of the axis of rotation of the drive cam 432 and the driven cam 434 (i.e., the pins 456). The pulling force on the belt release cable 464 then causes further rotation of the drive cam 432 and the driven cam 434 to the position shown in FIG. 43. In this position, the belt tension links 416, 420 have been rotated by the eccentric pivot mounts 422, 424 so that the pins 426 are forward of the pins 456. Moving the belt tension links 416, 420 eccentrically in this manner moves the toothed belt clamp 406 forward in the grooved bearings 450. This movement forward releases the tension on the drive belt 404, and creates slack in the drive belt.

To re-tension the drive belt 404, the handle 470 is rotated so as to align the cap bolt 380 with the cutout 474, and the handle 470 is allowed to retract under the tension of the springs 460. Preferably, the tension of the springs 460 is sufficient to withdraw the handle 470 and overcome the tension of the drive belt 404 so as to pull the belt tension links 416, 420 back to the over-center position (shown in FIG. 39). Upon full release of the handle 470 and return of the belt release assembly to the position shown in FIGS. 37–39, the drive belt 404 is fully tensioned and locked into place. Retraction of the handle 470 permits the hinged closure panel 42 to once again be closed.

Figure 44:
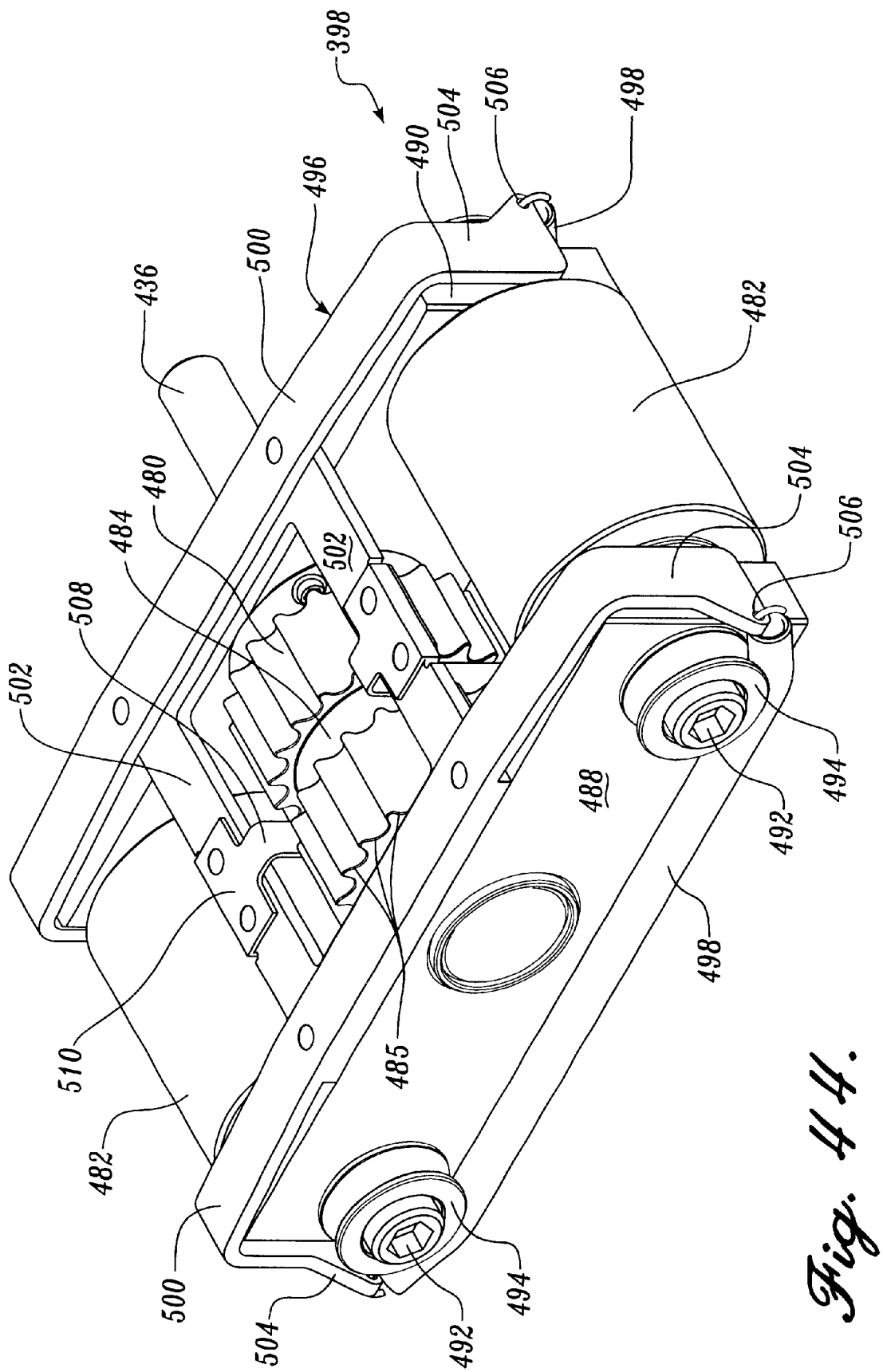
FIG. 44 is a side perspective view of a drive belt clutch mechanism in the ramp assembly in FIG. 29.
Figure 45:
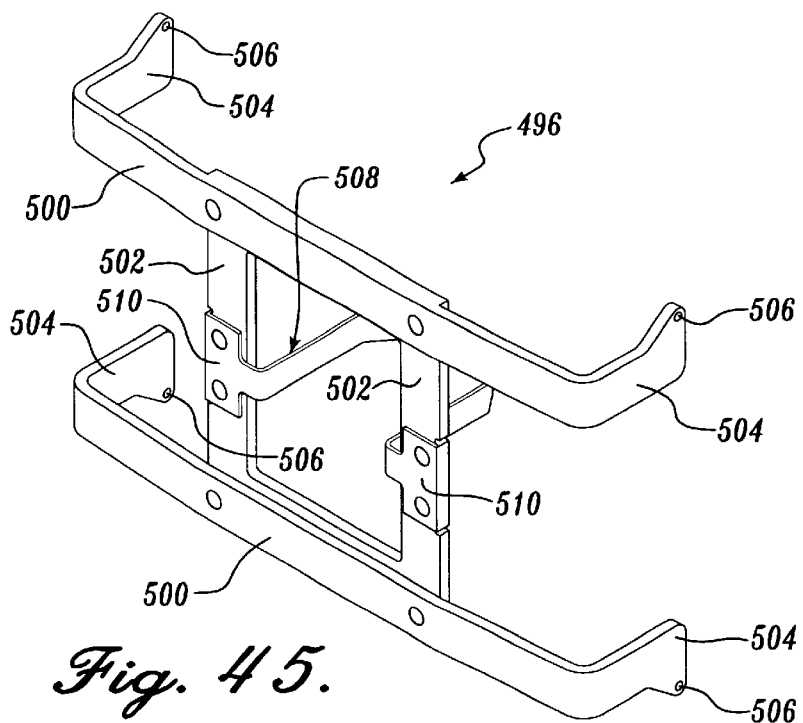
FIG. 45 is a side perspective view of a clutch saddle in the drive belt clutch mechanism in FIG. 44.

The drive belt clutch mechanism is shown in FIGS. 44–47. The drive belt clutch mechanism 398 includes a drive pulley 480 mounted parallel to and between two idler pulleys 482 (FIG. 44). The drive pulley 480 includes a clutch groove 484 extending around its circumference and located at its center. The drive pulley 480 is mounted for rotation about a drive shaft 486 that extends through front and rear pulley mounting plates 488, 490. The drive pulley 480 includes teeth 485 around its perimeter except at the clutch groove 484. The teeth 485 are spaced so as to receive the teeth on the drive belt 404.

The idler pulleys 482 are mounted on idler shafts (not shown) for rotation thereon. Bolts 492 extend through spring guides 494 and through the pulley mounting plate 488 or 490 and into the idler shafts. The spring guides 494 are rings with a circumferential groove.

A clutch saddle 496 (FIG. 45) rests across the top of the pulley mounting plates 488, 490, and is held in position by two springs 498. The clutch saddle 496 includes two mounting plate bars 500 attached by two cross braces 502. The cross braces 502 and the mounting plate bars 500 form a rectangle, and the mounting plate bars extend beyond the rectangle. At distal ends of the mounting plate bars 500 are spring arm attachments 504 that extend downward at approximately a 90° angle to the mounting plate bars. Holes 506 are located on the spring arm attachments 504 for receiving the ends of the springs 498.

A clutch band 508 extends across and forms a downward loop between the two cross braces 502. The clutch band 508 includes two cross brace attachments 510 and a bottom rounded section 512 for fitting about the clutch groove 484 of the drive pulley 480. As can best be seen in FIGS. 46 and 47, the clutch band 508 is configured such that the radius of curvature of the rounded section substantially matches the radius of curvature of the outer circumference of the teeth 485 on the drive pulley 480. Two flattened sections 514 are formed at the outer ends of the bottom rounded section 512 for directing the drive belt 404 away from the teeth of the drive pulley 480. The clutch band 508 extends substantially straight upward from the flattened sections 514 to the cross brace attachments 510.

The clutch saddle 496 is preferably formed as a weldment of stiff metal, such as steel. The springs 498 are attached to the spring arm attachments 504 and extend under the spring guides 494. The springs 498 bias the clutch saddle downward against the upper surface of pulley mounting plates 488, 490, toward the position shown in FIG. 47.

Figure 46:
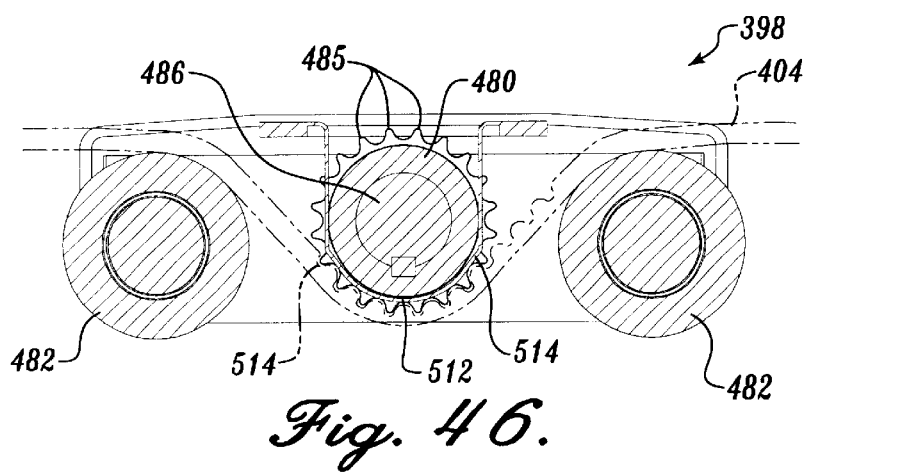
FIG. 46 is a side cutaway view showing the drive belt extending through the drive belt clutch mechanism in FIG. 44, with the drive belt tensioned.
Figure 47:
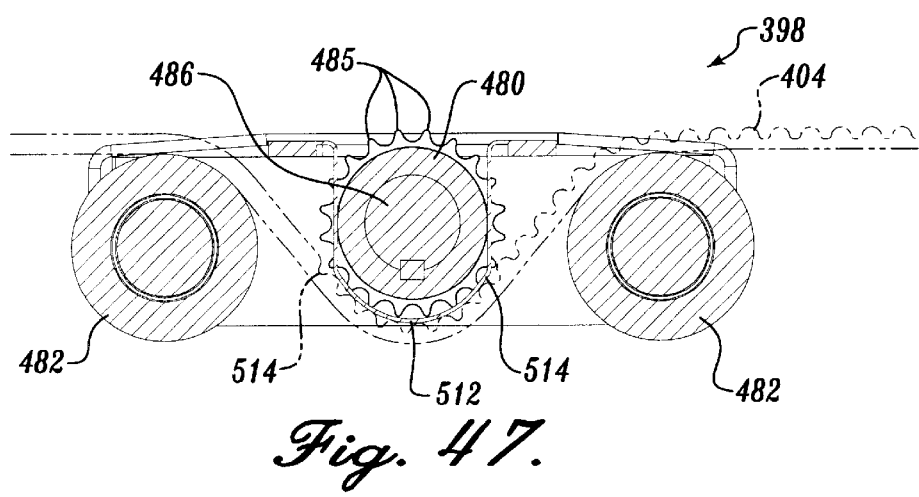
FIG. 47 is the cutaway view in FIG. 46, with the drive belt released.

In operation, when the drive belt 404 is tensioned, the tension of the drive belt pulls the clutch saddle 496 upward into the position shown in FIG. 46 so that the teeth of the drive belt engage the teeth 485 of the drive pulley 480. The drive belt 404 is wider than the clutch groove 484, so it extends across the clutch groove to engage the teeth 485 on both sides of the clutch groove. When the drive belt 404 is released by the belt release assembly 402, the springs 498 urge the clutch saddle 496 downward, and push the teeth of the drive belt 404 out of engagement with the teeth of the drive pulley 480. In this manner, the ramp platform 28 can be extended and retracted with the drive belt 404 released from the drive pulley 480 so that an operator does not have to turn the motor upon extension and retraction.

It is important that the tension of the springs 498 not be too strong so as to stretch the drive belt 404 or bend the clutch saddle 496 during operation. Instead, a spring tension should be selected such that the force downward on the clutch saddle 496 by the springs 498 is sufficient to take the slack in the released drive belt 404 and move that slack downward by the pressure of the clutch saddle 496.

The ramp platform 28 includes an elongate slot 520 along its leading end. During manual extension of the ramp platform 28, the hook 386 on the release tool 382 can be inserted into the elongate slot, and the operator can pull the ramp platform 28 outward. This operation permits the operator to extend the ramp platform 28 without inserting hands into the rectangular enclosure 24 or having to bend over to reach the ramp platform 28.

Figure 48:
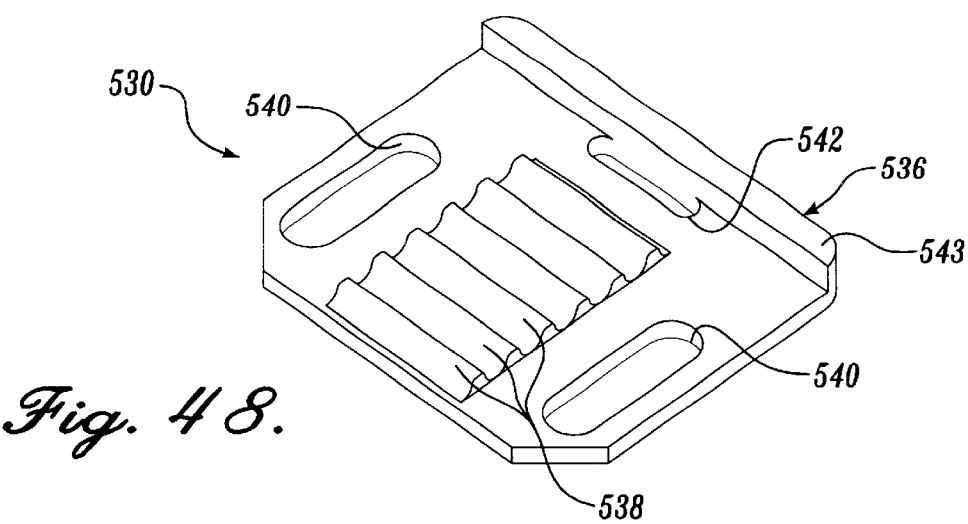
FIG. 48 is a side perspective view of an adjustable clamp for a belt tensioner in the ramp assembly in FIG. 29.
Figure 49:
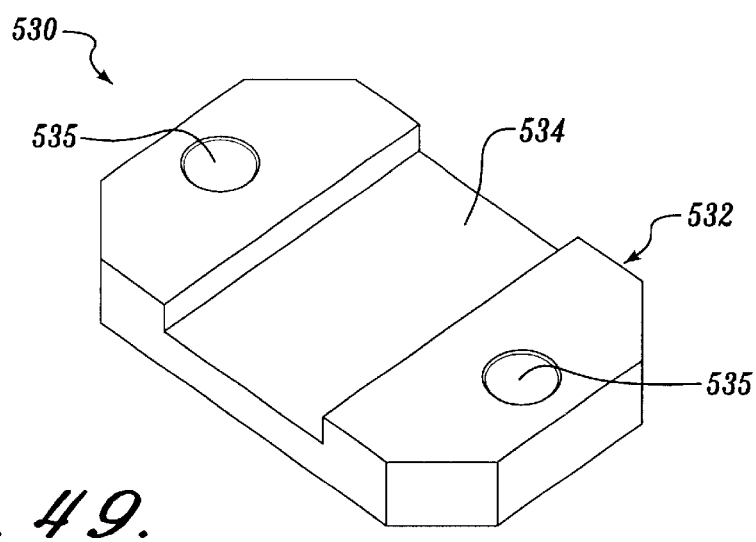
FIG. 49 is a stationary plate used with the adjustable clamp in FIG. 48 in formation of the belt tensioner for the ramp assembly in FIG. 29.
Figure 50:
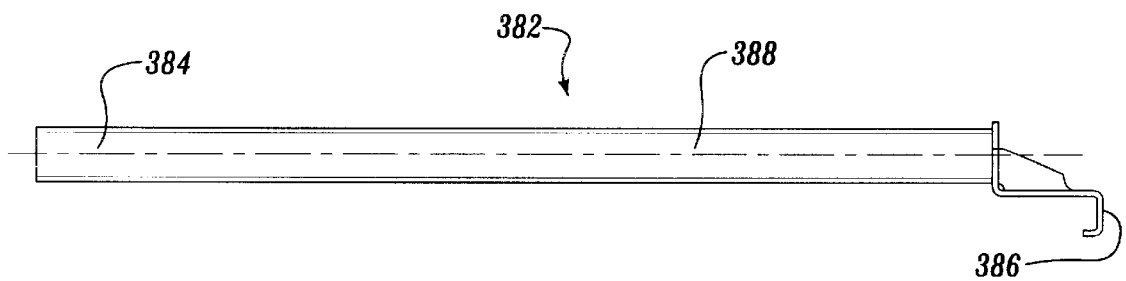
FIG. 50 is a release tool for use with the ramp assembly in FIG. 29.

The components of a belt tensioner 530 for the drive belt 404 are shown in FIGS. 48 and 49. A stationary plate 532 (FIG. 49) including a groove 534 for receiving the drive belt 404 is mounted to the underside of the structural channel 60. The stationary plate 532 includes mounting holes 535 on opposite sides of the groove 534. An adjustable clamp 536 (FIG. 48) is mounted between the stationary plate 532 and a metal plate 537 that extends under the structural channel 60. The adjustable clamp includes a series of ribs 538 extending along its middle and two elongate slots 540 extending along the sides of the ribs. A grasping slot 542 is located at the front end of the ribs 538, and a flange 543 is aligned across the front of adjustable clamp 536.

Figure 52:
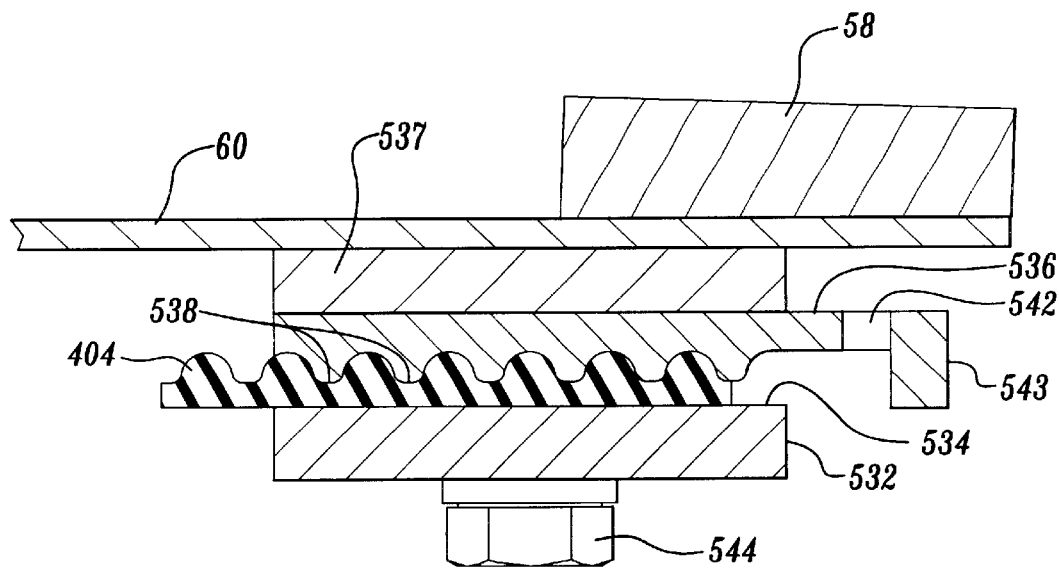
FIG. 52 is a side cutaway view of the belt tensioner for the ramp assembly in FIG. 29, the parts of which are shown in FIGS. 40 and 49.

To mount the drive belt 404, the teeth of the drive belt are matched with the ribs 538 of the adjustable clamp 536, and the opposite, smooth side of the drive belt is arranged within the groove 534 of the stationary plate 532. Fasteners such as screws or bolts 544 (only one shown in FIG. 52) are extended (through the holes 535 on the stationary plate 532) through the slots 540, and into the metal plate 537. The bolts 544 are anchored into the metal plate 537.

The bolts 544 are not tightened against the adjustable clamp 536 and stationary plate 532 until the drive belt 404 is tensioned. To tension the drive belt 404, a hook, screwdriver, or other tool is inserted into the grasping slot 542 and the adjustable clamp 536 is pulled outward relative to the stationary plate 532 so as to tension the drive belt. The adjustable clamp 536 and the grasping slot 542 are arranged so that they can be accessed when the hinged closure panel 42 is open, underneath upper cross member 58 of the rectangular enclosure 24. Once the drive belt 404 has sufficient tension, the bolts 544 are tightened to hold the adjustable clamp 536 into position. In this manner, the drive belt 404 is tensioned.

Periodically, after several extensions of the ramp platform 28, the drive belt 404 may be stretched, and may require tightening. To do this, the bolts 544 are loosened, a tool is placed in the grasping slot 542, and the drive belt 404 is tightened. The bolts 544 can then be retightened so as to fix the position of the adjustable clamp 536.

The ramp assembly 300 includes close-out bearings 552 (FIG. 41) formed of a low friction material such as Delrin. The close-out bearings 552 perform much of the same function as the V-shaped brackets 44 of the ramp assembly 20. However, the close-out bearings 552, because of the low friction material, do not damage or scratch the ramp platform 28 upon extension and retraction of the ramp assembly 300.

Figure 53:
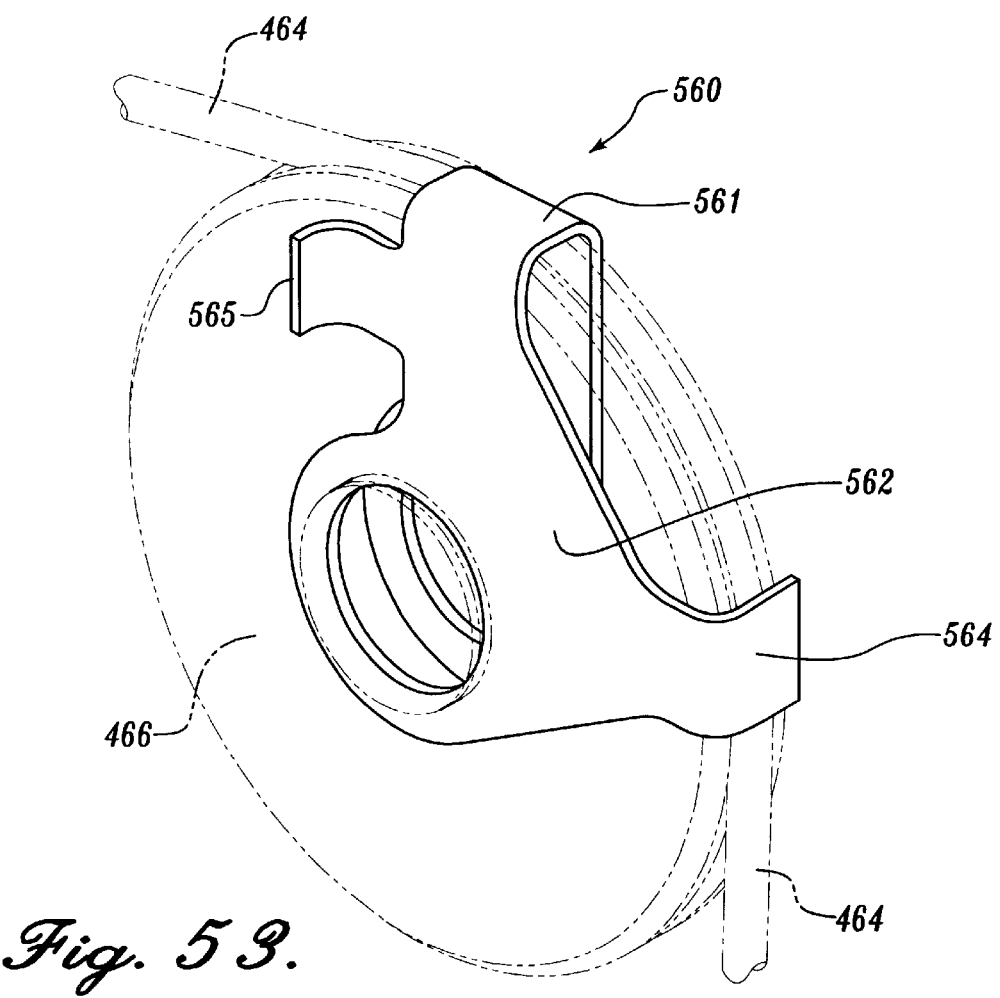
FIG. 53 is a side perspective view of a wire rope retainer for the pulleys in the ramp assembly in FIG. 29.

A wire rope retainer 560 (FIG. 53) is provided for the pulley 466. The wire rope retainer 560 is mounted over the pulley 466 so that the pulley freely spins therein. The wire rope retainer 560 is a single piece of metal that forms a U-bracket 561 that extends around the outside of the pulley 466 and is attached at the axle of the pulley on opposite sides of the pulley. A flange 562 extends along one side of the pulley 466 off of one side of the U-bracket 561 and upward to form an L-bracket 564 that fits around an edge of the pulley 466. The L-bracket 564 and the U-bracket 561 form two retainers for holding the cable 464 on the pulley 466.

A second L-bracket 565 extends outward from the flange 562 in opposite direction of L-bracket 564 and fits into a slot 567 (FIG. 37) of the bottom panel 38 adjacent to the axle 566 for the pulley 466. The L-bracket 565 prevents rotation of the wire rope retainer 560 when the manual bolt relase mechanism 400 is actuated. The wire rope retainer 560 retains the cable 464 on the pulley 466 should cable 464 go slack. The wire rope retainer 560 can also be used in a similar manner around the pulleys 200 and 202 and cable 184 of manual unlatching mechanism 366 or 180.

While the preferred embodiment of the invention has been illustrated and described with reference to preferred embodiments thereof, it will be appreciated that various changes can be made therein without departing from the spirit and scope of the invention as defined in the appended claims.

The embodiments of the invention in which an exclusive property or privilege is claimed are defined as follows:

1. A ramp assembly comprising:
   (a) a frame;
   (b) a ramp platform mounted in the frame defining trailing and forward ends and extendible and retractable along a length of the frame between stowed and deployed positions, the ramp platform being arranged when deployed such that the forward end extends down toward the ground;
   (c) a first locking mechanism that locks the ramp platform into a fully deployed position, wherein the first locking mechanism comprises a first latch plate attached to the frame and a first latch arm operatively associated with the ramp platform to extend and retract with the ramp platform and configured and arranged so as to engage and lock onto the first latch plate when the ramp platform is in the fully deployed position, wherein the first locking mechanism comprises a second latch plate attached to the frame and a second latch arm operatively associated with the ramp platform to extend and retract with the ramp platform and configured and arranged so as to engage and lock onto the second latch plate when the ramp platform is in the fully deployed position;
   (d) a second locking mechanism that locks the ramp platform into a fully stowed position;
   (e) a coupling linking movement of the first and second latch arms;
   (f) a spring arranged to bias the first and second latch arms to engage and lock onto the first and second latch plates, respectively;
   (g) a solenoid actuator operatively associated with the second latch arm so that actuation of the solenoid actuator disengages the first and second latch arms from the first and second latch plates, respectively, in the fully deployed position, and disengages the second latch arm from the stowed latch plate in the fully stowed position;
   (h) a reciprocating mechanism for extending and retracting the ramp platform along a length of the frame between stowed and deployed positions; and
   (i) a time delay circuit, the time delay circuit configured to delay the actuation of the reciprocating mechanism until after actuation of the solenoid actuator, so that the first and second latch arms are fully disengaged from the first and second latch plates, respectively, before actuation of the reciprocating mechanism in the fully deployed position, and so that the second latch arm is fully disengaged from the stowed latch plate before actuation of the reciprocating mechanism in the fully stowed position.

2. The ramp assembly of claim 1, wherein the first and second latch plates are adjustable along a longitudinal axis of the frame.

3. The ramp assembly of claim 1, wherein the second locking mechanism comprises a stowed latch plate attached to the frame that is engaged by and locked onto by the second latch arm when the ramp platform is in the fully stowed position.

4. The ramp assembly of claim 1, wherein the time delay circuit is further configured to simultaneously deactuate the solenoid actuator and actuate the reciprocating mechanism.

5. A ramp assembly comprising:
   (a) a frame;
   (b) a ramp platform mounted in the frame defining trailing and forward ends and extendible and retractable along a length of the frame between stowed and deployed positions, the ramp platform being arranged when deployed such that the forward end extends down toward the ground;
   (c) a first locking mechanism that locks the ramp platform into a fully deployed position, wherein the first locking mechanism comprises a first latch plate attached to the frame and a first latch arm operatively associated with the ramp platform to extend and retract with the ramp platform and configured and arranged so as to engage and lock onto the first latch plate when the ramp platform is in the fully deployed position;

(d) a second locking mechanism that locks the ramp platform into a fully stowed position, wherein the second locking mechanism comprises a stowed latch plate attached to the frame that is engaged by and locked onto by the first latch arm when the ramp platform is in the fully stowed position;

(e) a spring arranged to bias the first latch arm to engage and lock onto the first latch plate;

(f) a solenoid actuator operatively associated with the first latch arm so that actuation of the solenoid actuator disengages the first latch arm from the first latch plate in the fully deployed position, and disengages the first latch arm from the stowed latch plate in the fully stowed position;

(g) a reciprocating mechanism for extending and retracting the ramp platform along a length of the frame between stowed and deployed positions; and (h) a time delay circuit, the time delay circuit configured to delay the actuation of the reciprocating mechanism until after actuation of the solenoid actuator, so that the first latch arm is fully disengaged from the first latch plate before actuation of the reciprocating mechanism in the fully deployed position, and so that the first latch arm is fully disengaged from the stowed latch plate before actuation of the reciprocating mechanism in the fully stowed position.

6. The ramp assembly of claim 5, wherein the time delay circuit is further configured to simultaneously deactuate the solenoid actuator and actuate the reciprocating mechanism.

7. The ramp assembly of claim 5, further comprising a single manual release mechanism, actuation of which (1) releases the first locking mechanism when the ramp assembly is in the fully deployed position and (2) releases the second locking mechanism when the ramp platform is in the fully stowed position.

8. The ramp assembly of claim 7, wherein the first latch plate is adjustable along the longitudinal axis of the frame.

9. The ramp assembly of claim 7, wherein the second latch plate is adjustable along a longitudinal axis of the frame.

10. The ramp assembly of claim 5, wherein the first locking mechanism comprises a second latch plate attached to the frame and a second latch arm operatively associated with the ramp platform to extend and retract with the ramp platform and configured and arranged so as to engage and lock onto the second latch plate when the ramp platform is in the fully deployed position.

11. The ramp assembly of claim 10, further comprising a coupling linking movement of the first and second latch arms.

12. The ramp assembly of claim 11, wherein the single manual release mechanism comprises a handle (1) operatively associated with the first latch arm when the ramp platform is in the deployed position such that actuation of the handle causes the first and second latch arms to release the first and second latch plates, and (2) operatively associated with the first latch arm when the ramp platform is in the stowed position such that actuation of the handle causes the second latch arm to release the stowed latch plate.

13. A ramp assembly comprising:

(a) a frame;

(b) a ramp platform mounted in the frame defining trailing and forward ends and extendible and retractable along a length of the frame between stowed and deployed positions, the ramp platform being arranged when deployed such that the forward end extends down toward the ground;

(c) a first locking mechanism that locks the ramp platform into a fully deployed position, wherein the first locking mechanism comprises a first latch plate attached to the frame and a first latch arm operatively associated with the ramp platform to extend and retract with the ramp platform and configured and arranged so as to engage and lock onto the first latch plate when the ramp platform is in the fully deployed position;

(d) a second locking mechanism that locks the ramp platform into a fully stowed position, wherein the second locking mechanism comprises a stowed latch plate attached to the frame that is engaged by and locked onto by a second latch arm when the ramp platform is in the fully stowed position;

(e) a solenoid actuator operatively associated with the first and second latch arms so that actuation of the solenoid actuator disengages the first latch arm from the first latch plate in the fully deployed position, and disengages the second latch arm from the stowed latch plate in the fully stowed position;

(f) a reciprocating mechanism for extending and retracting the ramp platform along a length of the frame between stowed and deployed positions; and (g) a time delay circuit, the time delay circuit configured to delay the actuation of the reciprocating mechanism until after actuation of the solenoid actuator, so that the first latch arm is fully disengaged from the first latch plate before actuation of the reciprocating mechanism in the fully deployed position, and so that the second latch arm is fully disengaged from the stowed latch plate before actuation of the reciprocating mechanism in the fully stowed position.

14. The ramp assembly of claim 13, wherein the time delay circuit is further configured to simultaneously deactuate the solenoid actuator and actuate the reciprocating mechanism.

* * * * *